(12) United States Patent
Ohara et al.

(10) Patent No.: US 8,645,522 B2
(45) Date of Patent: Feb. 4, 2014

(54) SERVICE REGISTERING SYSTEM

(75) Inventors: Kiyotaka Ohara, Nagoya (JP); Kazuma Aoki, Kasugai (JP); Makoto Matsuda, Aisai (JP); Masafumi Miyazawa, Nagoya (JP); Satoru Yanagi, Nagoya (JP); Masatoshi Kokubo, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 893 days.

(21) Appl. No.: 11/266,585

(22) Filed: Nov. 4, 2005

(65) Prior Publication Data

US 2006/0136566 A1 Jun. 22, 2006

(30) Foreign Application Priority Data

Nov. 5, 2004 (JP) .................. 2004-322948

(51) Int. Cl.
*G06F 15/173* (2006.01)
*G06F 15/16* (2006.01)

(52) U.S. Cl.
USPC ............ 709/224; 709/226; 709/227; 709/228

(58) Field of Classification Search
USPC .................. 709/224, 226, 227, 228
See application file for complete search history.

(56) References Cited

U.S. PATENT DOCUMENTS

| | | | | |
|---|---|---|---|---|
| 5,537,550 A * | 7/1996 | Russell et al. | ................ | 709/224 |
| 5,909,602 A | 6/1999 | Nakai et al. | | |
| 5,946,457 A | 8/1999 | Nakai et al. | | |
| 7,312,886 B2 * | 12/2007 | Gomi | ........................... | 358/1.15 |
| 8,161,129 B2 * | 4/2012 | Kawamoto et al. | ........... | 709/217 |
| 2001/0018718 A1 * | 8/2001 | Ludtke et al. | ................. | 709/321 |
| 2002/0093525 A1 * | 7/2002 | Asauchi | ........................ | 345/714 |
| 2003/0053135 A1 * | 3/2003 | Simpson et al. | ............... | 358/2.1 |
| 2003/0117642 A1 | 6/2003 | Haraguchi | | |
| 2003/0135549 A1 * | 7/2003 | Kuno et al. | .................... | 709/203 |
| 2004/0187036 A1 * | 9/2004 | Nakamura | .................... | 713/202 |
| 2004/0205780 A1 * | 10/2004 | Hara et al. | ..................... | 719/321 |
| 2004/0242209 A1 * | 12/2004 | Kruis et al. | ................ | 455/414.1 |
| 2005/0138065 A1 * | 6/2005 | Ciriza | ........................ | 707/104.1 |
| 2006/0209359 A1 * | 9/2006 | Kadowaki | ..................... | 358/474 |

FOREIGN PATENT DOCUMENTS

| | | |
|---|---|---|
| EP | 0 782 326 | 7/1997 |
| JP | 9-238215 | 9/1997 |
| WO | WO 2004/091188 | 10/2004 |

* cited by examiner

*Primary Examiner* — Karen Tang
(74) *Attorney, Agent, or Firm* — Banner & Witcoff, Ltd.

(57) ABSTRACT

A service registration system includes a server that provides a service through a network, a peripheral device capable of communicating with the server and using the service, and a terminal device capable of communicating with the server and the peripheral device. When the terminal device receives the registration requesting information representing information related to registration necessary for using the service from a user, the terminal device transmits registration requesting information to the server. When the server receives the registration requesting information from the terminal device, the server transmits service information necessary for using the service. Further, the terminal device can transmit the service information to the peripheral device when it receives the service information from the server. Further, when the peripheral device receives the service information from the terminal device, the peripheral device stores the received service information and operates in a mode where the service is usable.

19 Claims, 33 Drawing Sheets

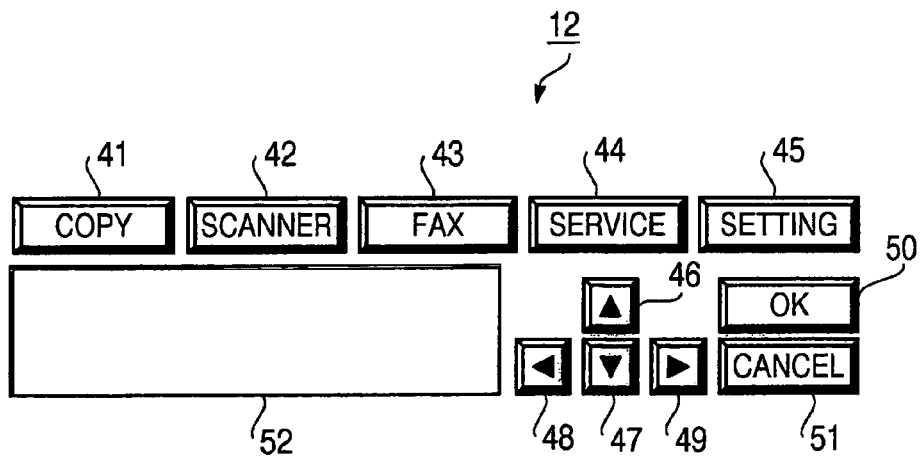

FIG. 2

| | DATA NAME | DATA TYPE | DESCRIPTION |
|---|---|---|---|
| BASIC DATA | ID | INTEGER | IDENTIFICATION INFORMATION OF SERVICE DEFINITION INFORMATION |
| | Title | CHARACTER STRING | DISPLAY TITLE |
| | Type | "MENU" OR "FORM" | BODY DATA TYPE |
| BODY DATA TYPE (WHEN TYPE IS "MENU") | Num_Link | INTEGER | THE NUMBER OF LINK DATA |
| | Link[ ] | − | ACTUAL LINK DATA(EXPLAINED LATER) |
| LINK DATA | Link_Title | CHARACTER STRING | DISPLAYED CHARACTER STRING FOR EXPLAINING SERVICE OF OR INFORMATION ON THE LINK DESTINATION |
| | Link_Location | CHARACTER STRING | URL FOR SERVICE OR ID FOR OTHER SERVICE DEFINITION INFORMATION |

FIG. 3

|  | DATA NAME | DATA TYPE | DESCRIPTION |
|---|---|---|---|
| BASIC DATA | ID | INTEGER | IDENTIFICATION INFORMATION OF SERVICE I/F INFORMATION |
| | Title | CHARACTER STRING | DISPLAY TITLE |
| | Type | "MENU" OR "FORM" | BODY DATA TYPE |
| BODY DATA (WHEN TYPE IS "FORM") | Action | URL CHARACTE STRING | URL OF PROGRAM FOR RECEIVING AND PROCESSING INPUT DATA |
| | Num_Form_Elem | INTEGER | THE NUMBER OF Form_Elem |
| | Form_Elem[ ] | — | TYPE-DEPENDENT Form ELEMENT DATA |
| Form_Elem DATA (FORM ELEMENT DATA) | Form_Type | "TEXT" OR "PASSEORD" OR "SELECT" | THE TYPE OF FORM ELEMENT |
| | Form_Data | — | TYPE-DEPENDENT DATA |
| FORM_DATA DATA ("TEXT" OR "PASSWORD") | Disp_Name | CHARACTER STRING | CHARACTER STRING EXPLAINING INPUT ITEMS |
| | Value_Name | CHARACTER STRING | VARIABLE NAME WHEN TRANSMITTING AS DATA |
| | Max_Byte | INTEGER | MAXIMUM NUMBER OF BYTES OF CHARACTER STRING WHICH CAN BE INPUT |
| | Default_String | CHARACTER STRING | CHARACTER STRING INITIALLY DISPLAYED IN INTIAL STATE |
| Form_DATA DATA (SELECT) | Disp_Name | CHARACTER STRING | CHARACTER STRING EXPLAINING INPUT ITEMS |
| | Value_Name | CHARACTER STRING | VARIABLE NAME WHEN TRANSMITTING AS DATA |
| | Multi_Select | 0 OR 1 | 0: MULTIPLE SELECTIONS PROHIBITED<br>1: MULTIPLE SELECTIONS ALLOWED |
| | Num_Option | INTEGER | THE NUMBER OF SELECTION ITEMS |
| | Option[ ] | — | INFORMATION RELATED TO SELECTION ITEMS (EXPLAINED HEREAFTER) |
| OPTION DATA | Disp_Select | CHARACTER STRING | DISPLAYED CHARACTER STRING SHOWING CHOICES |
| | Disp_Value | CHARACTER STRING | VALUE WHEN TRANSMITTED AS DATA WHEN SELECTED |
| | Default_Select | 0 or 1 | 0: NOT SELECTED IN INITIAL STATE<br>1: SELECTED IN INITIAL STATE |

FIG. 4

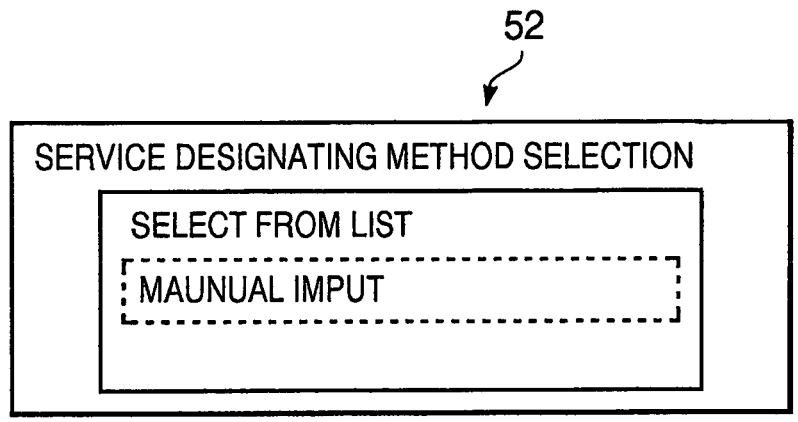

FIG. 8

```
<ID>11111110</ID>
<Title>DIRECTORY SERVICE</Title>
<Type>MENU</Type>
<Num_Link>3</Num_Link>
<Link>
  <Link_Title>DATA STORAGE SERVICE</Link_Title>
  <Link_Location>11111111</Link_Location>
</Link>
<Link>
  <Link_Title>PRINT SERVICE </Link_Title>
  <Link_Location>11111112</Link_Location>
 </Link>
<Link>
  <Link_Title>COPY APPLICATION SERVICES</Link_Title>
  <Link_Location>11111113</Link_Location>
</Link>
```

FIG. 9

```
<ID>11111113</ID>
<Title>COPY APPLICATION SERVICE</Title>
<Type>MENU</Type>
<Num_Link>4</Num_Link>
<Link>
  <Link_Title>COPY WITH WATERMARK</Link_Title>
    <Link_Location>http://suk.example.co.jp/cgi_bin/suktop</Link_Location>
</Link>
<Link>
  <Link_Title>TRANSLATION COPY </Link_Title>
    <Link_Location>http://hon.example.co.jp/cgi_bin/top</Link_Location>
</Link>
<Link>
  <Link_Title>READ ALOUD</Link_Title>
    <Link_Location>http://example.yomiage.com/cgi_bin/yomi</Link_Location>
</Link>
<Link>
  <Link_Title>VOICE-TEXT CONVERSION</Link_Title>
    <Link_Location>http://ototeki.com/cgi_bin/oo</Link_Location>
</Link>
```

FIG.11

```
<ID>11111110</ID>
<Title>TRANSLATION COPY</Title>
<Type>FORM</Type>
<Action>
http://hon.example.co.jp/cgi_bin/service
</Action>
<Num_Form_Elem>4</Num_Form_Elem>
<Form_Elem>
 <Form_Type>Select</Form_Type>
 <Form_Data>
  <Disp_Name>LANGUAGE SELECTION</Disp_Name>
  <Value_Name>lang</Value_Name>
  <Multi_Select>0</Multi_Select>
  <Num_Option>2</Num_Option>
  <Option>
   <Disp_Select>ENGLISH→JAPANESE</Disp_Select>
   <Disp_Value>en_ja</Disp_Value>
   <Default_Select>1</Default_Select>
  </Option>
  <Option>
   <Disp_Select>Japanese→English</Disp_Select>
   <Disp_Value>ja_en</Disp_Value>
   <Default_Select>0</Default_Select>
  </Option>
 </Form_Data>
</Form_Elem>
<Form_Elem>
 <Form_Type>Select</Form_Type>
 <Form_Data>
CONTINUED <Disp_Name>SCANNER SETTING</Disp_Name>
  <Value_Name>scan_res</Value_Name>
  <Multi_Select>0</Multi_Select>
  <Num_Option>2</Num_Option>
  <Option>
   <Disp_Select>NORMAL FONT</Disp_Select>
   <Disp_Value>300</Disp_Value>
   <Default_Select>1</Default_Select>
  </Option>
  <Option>
   <Disp_Select>SMALL FONT</Disp_Select>
   <Disp_Value>600</Disp_Value>
   <Default_Select>0</Default_Select>
  </Option>
 </Form_Data>
</Form_Elem>
<Form_Elem>
 <Form_Type>Select</Form_Type>
 <Form_Data>
  <Disp_Name>PRINT SETTING</Disp_Name>
  <Value_Name>print_res</Value_Name>
  <Multi_Select>0</Multi_Select>
  <Num_Option>3</Num_Option>
  <Option>
   <Disp_Select>PRINT SPEED PRIORITIZED</Disp_Select>
   <Disp_Value>200</Disp_Value>
   <Default_Select>0</Default_Select>
  </Option>
CONTINUED <Option>
   <Disp_Select>NORMAL</Disp_Select>
   <Disp_Value>300</Disp_Value>
   <Default_Select>1</Default_Select>
  </Option>
  <Option>
   <Disp_Select>FINE</Disp_Select>
   <Disp_Value>600</Disp_Value>
   <Default_Select>0</Default_Select>
  </Option>
 </Form_Data>
</Form_Elem>
<Form_Elem>
 <Form_Type>Text</Form_Type>
 <Form_Data>
  <Disp_Name>COMMENT</Disp_Name>
  <Value_Name>comment</Value_Name>
  <Max_Byte>100</Max_Byte>
  <Default_String>
JAPANESE TRANSLATION OF ENGLISH TECHNICAL
REPORT 0010 WITH TRANSLATION COPY SERVICE
  </Default_String>
 </Form_Data>
</Form_Elem>
```

FIG. 15

HTML1

```html
<html>
<body>
Service Registration Page<br>
<form method=>"POST" action="HTTP://adgi.com/regist.cgi">
<table>
<tr>
<td>Device Address</td>
   <td><input type="text" name="ip_address"><td>
</tr>
<tr>
<td>Service Type</td>
   <td>
   <selec name=service_type" size=1>
     <option value="honyaku">xxTranslation Service
     <option value="tuuchi">xxNotification Service
   </select>
   </td>
</tr>
<tr>
<td>User Name</td>
  <td><input type="text" name="user_name"></td>
</tr>
<tr>
<td>Password</td>
  <td><input type="password" name="register_password"></td>
</tr>
<tr>
  <td></td>
  <td><input type="rest" value="Cancel"><input type="submit" value="Submit"></td>
</tr>
</table>
</form>
</body>
</html>
```

FIG.31

HTML2

```
<html>
<body>
Do you want to register Service infomtion with the device?<br>
</br>
<table>
<tr>
<td>Device addtrss:</td>
  <td>192.168.23.45</td>
</tr>
<tr>
  <td>Service</td>
  <td>xxTranslation Service</td>
</tr>
<tr>
  <td>User Name:</td>
  <td>Richard</td>
</tr>
<tr>
<td></td>
<td><A href="http://adgi.com/registpage.html" target="blank">Registration Page</A></td>
</tr>
<table>
<form method="POST" action="http://192.168.23.45/regist.cgi">
<table>
<tr>
<td></td>
<td>
<INPUT TYPE="hidden" NAME="userID" VALUE="Richard">
<INPUT TYPE="hidden" NAME="imfcsessionControlRequestUrl" VALUE=" http://>
adgi.com/sessionControl.cgi>
<INPUT    TYPE="hidden"    NAME="    imfcDisplayNameForBookMark>
VALUE="xxTranslation Service">
<INPUT TYPE>"submit" VALUE="Regist">
</td>
<tr>
</table>
</form>
</body>
</html>
```

FIG.32

HTML3

```
<html>
<body>
Completion of Registion <br>
Service information has been regiatered with the device.<br>
<br>
<table>
<tr>
 <td>Device Address</td>
 <td>192.168.23.45</td>
</tr>
<tr>
<td>Servuce</td>
<td>xxTranslation Service</td>
</tr>
<tr>
 <td>User Name:</td>
 <td>Richard</td>
</tr>
<tr>
 <td></td>
 <td><A href="http://adgi.com/registpage.html"target="_blank">Return to Registration Page</A></td>
</tr>
</table>
</body>
</html>
```

FIG.33

SERVICE REGISTERING SYSTEM

CROSS REFERENCE TO RELATED APPLICATIONS

This application claims priority from Japanese Patent Application No. 2004-322948, filed on Nov. 5, 2004. The entire subject matter of the application is incorporated herein by reference.

TECHNICAL FIELD

Aspects of the invention relate to a service registration system in which usage information regarding usable services is registered with a peripheral (terminal) device that can function using a service provided via a network.

BACKGROUND

Recently, there is provided a terminal (peripheral) device (e.g., a personal computer, a printer, a scanner, a facsimile device or a multi function peripheral having a network function) which can enhance its function by communicating with a server providing various services (e.g., data processing) through a network. In such a terminal device, further information (e.g., information of a service menu) necessary for using the services may be downloaded from the server. An example of such a system is disclosed in Japanese Patent Provisional Publication No. HEI 9-238215.

In such a terminal device, a display panel is provided to display various pieces of operational information. Typically, such a display panel is relatively poor in comparison with that of a terminal device of a personal computer or the like. For example, when a new service is to be provided, an explanation of the service is to be displayed in the display panel. However, due to the poorness of the display panel, the explanation may not be fully displayed. Further, in such a terminal device, an operation panel is also poor and its function is limited. When, for example, a user intends to apply for a new service for use in the terminal device, a relatively complicated operation may become necessary. However, in the conventional terminal device, the complicated operation may not be done using such an operation panel.

It is desired that at least for a registration application, which is an important operation, a terminal device is provided with sufficient user interfaces. However, in many cases, it is necessary to register various pieces of information such as server identification information (e.g., URL) and attribution information for a service (e.g., user name, user password) with the terminal device. That means, with only the terminal device provided with sufficient user interfaces, the service provided by the server cannot be used.

SUMMARY

Aspects of the invention provide an improved service registration system with which the user can submit a registration application for services to be used by a peripheral device using a terminal device having an adequate user interface, and it becomes possible that the peripheral device can also use the service provided by the server.

BRIEF DESCRIPTION OF THE ACCOMPANYING DRAWINGS

FIG. 2 shows a configuration of an operation unit according to aspects of the invention.

FIG. 3 shows a table providing a definition of each tag in the service definition information according to aspects of the invention.

FIG. 4 shows a table indicating the definition of each tag in the service I/F information according to aspects of the invention.

FIG. 8 shows a designation method selecting window according to aspects of the invention.

FIG. 9 shows an example of service definition information data according to aspects of the invention.

FIG. 11 shows another example of service definition information data according to aspects of the invention.

FIG. 15 shows an example of service I/F information data according to aspects of the invention.

FIGS. 31-33 show HTML1, HTML2 and HTML3, which are examples of html data used when the service information is registered according to aspects of the invention.

DETAILED DESCRIPTION

General Overview

Figure 1:
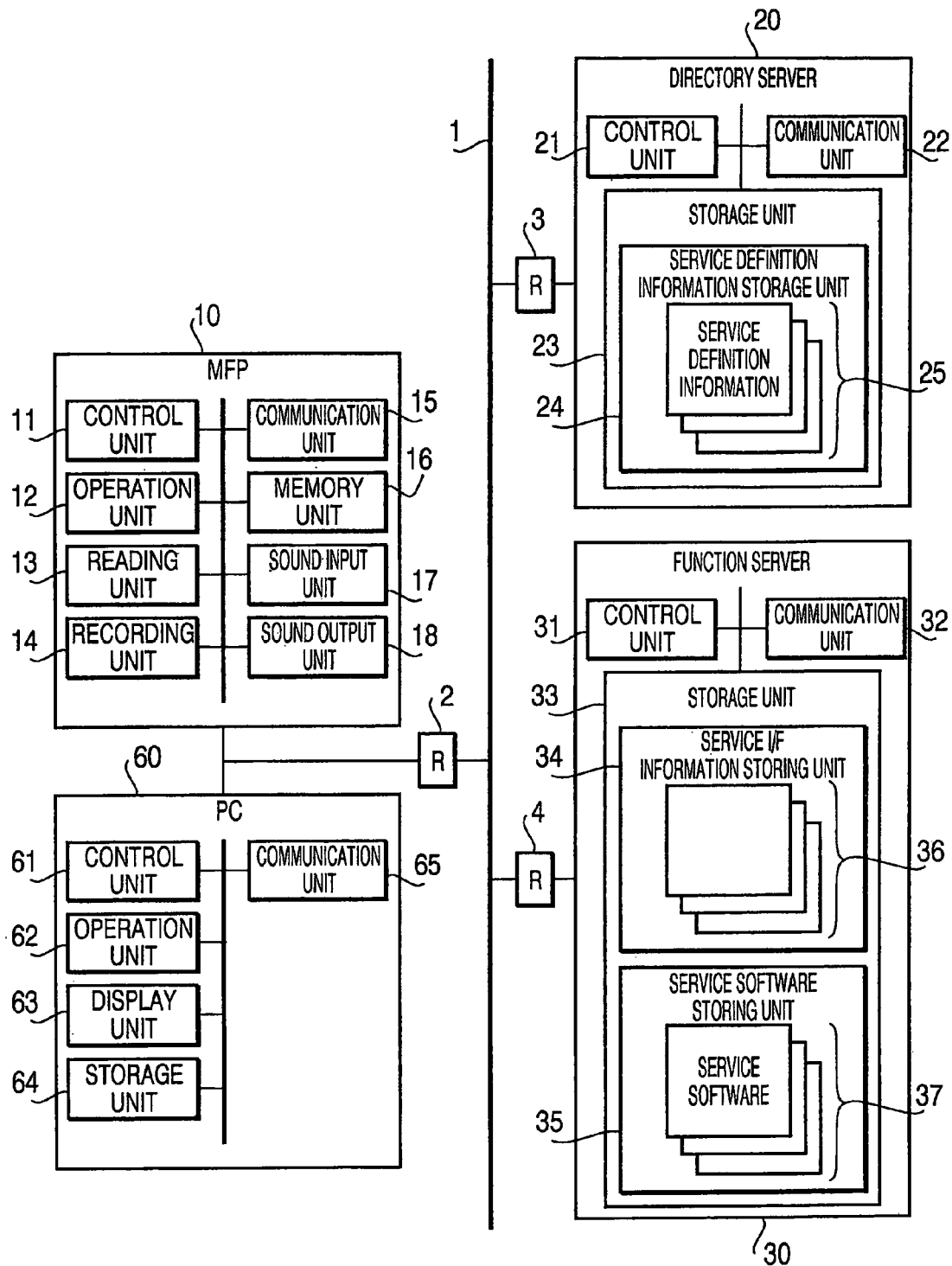
FIG. 1 is a block diagram showing a configuration of the service providing system according to aspects of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided a service registration system which is provided with a server that provides a service through a network, a peripheral device capable of communicating with the server and using the service, and a terminal device capable of communicating with the server and the peripheral device. When the terminal device receives the registration requesting information representing information related to registration necessary for using the service from a user, the terminal device transmits registration requesting information to the server. When the server receives the registration requesting information from the terminal device, the server transmits service information necessary for using the service to the terminal device. Further, the terminal device is configured to transmit the service information to the peripheral device when it receives the service information from the server. Further, when the peripheral device receives the service information from the terminal device, the peripheral device stores the received service information and operates in a mode where the service is usable.

The "service" in the above description should be interpreted as any function that brings a desired result such as the peripheral device and the server communicate with each other. For example, the "service" may include OCR, translation, proofreading, sound conversion, data storage, and the like. The "registration request information" may include type of service, available term, user name, password, and the like. The "service information" may include identification information (e.g., user name/password) for using the service.

According to the service registration system described above, the registration in order to use the service, which generally requires a complicated procedure, can be done relatively easily since the peripheral device generally has an inadequate user interface, and the terminal device has a well equipped user interface. Registration of the service information with the peripheral device can also be done within a sequence of operations. Therefore, user registration errors and operation difficultly can be suppressed.

According to aspects of the invention, service registration system may be configured as follows.

That is, the server may include a server communication unit enabling the server to communicate with the peripheral device and the terminal device, a service information transmission control unit that judges whether the registration request is appropriate, when receiving the registration requesting information from the terminal device via the server communication unit from the server device, the service information transmission control unit transmits the service information to the terminal device when the registration request is judged to be appropriate, and a service providing unit configured to communicate with the peripheral device to transmit the service via the server communication unit.

Further, the terminal device may include a registration information receiving unit configured to receive the registration requesting information related to registration for using the service, a terminal communication unit configured to communicate with the server and the peripheral device, a registration request information transmission control unit that transmits the registration request information the registration information receiving unit receives to the server via the terminal device communication unit, and a service information forward control unit configured such that when the service information is received via the terminal communication unit the service information forward control unit transmits the service information to the peripheral device via the terminal device communication unit.

Further, the peripheral device may include a peripheral device communicating unit enabling communication with the server and the terminal device, an information storage unit, a service information registration control unit configured such that, when the service information is received from the terminal device through the peripheral device communicating unit, the service information registration control unit stores the received service information in the information storing unit, and a service realizing unit that communicates with the server via the terminal device communicating unit based on the service information stored in the information storage unit.

According to further aspects, the server may include an image configuration information storing unit that stores image configuration information so that it can be transmitted to the terminal device via the server communicating unit, the image configuration information representing a configuration of an input image which is used when the registration information receiving unit receives the registration requesting information from the user. Further, the terminal device may include a displaying unit that displays an image, the displaying unit displaying the input image which is configured in accordance with the image configuration information obtained from the server via the terminal device communicating unit when the registration information receiving unit receives the registration information from the user.

With the above configuration, the user can input the registration request information following the input image displayed on the displaying unit. Therefore, the user can input the registration request information correctly and easily. Further, the input image is displayed based on the image configuration information, which is stored in the server side. Therefore, as the administrator revises the image configuration information, the input image displayed at the terminal device can be revised. Therefore, central control of specification of the input image can be done on the server side, and the input image can be changed easily.

If peripheral devices exist or a peripheral device is connected to a network with which devices are connected, the service information forward control unit needs to identify the peripheral device to which the service information received from the server should be transmitted.

In this regard, according to aspects of the invention, the input image displayed by the displaying unit may be provided with a portion in which peripheral device identifying information is to be input by the user, and the registration request information transmission control unit may be configured to transmit the peripheral device identifying information received by the registration information receiving unit to the server as one piece of the registration information. Further, the service information transmission control unit of the server may transmit the peripheral device identifying information received from the server to the terminal device together with the service information. Further, the service information forward control unit of the terminal device may identify the peripheral device to which the service information is transmitted based on the peripheral device identifying information received from the server and transmit the service information to the identified peripheral device.

With this configuration, the user can explicitly designate the peripheral device to be registered. Therefore, an erroneous transmission (i.e., transmission to a wrong peripheral device) due to wrong information (information to identify the peripheral device) registered in the terminal device can be prevented. Further, since the information for identifying a peripheral device is transmitted to the server, and the server can store the received information so that it is used when the service is to be provided.

Alternatively, according to aspects of the invention, the input image displayed by the displaying unit may be provided with a portion allowing the user to input peripheral device identifying information, and the terminal device may include a peripheral device identifying information storing unit. The registration request information transmitting unit may store the peripheral device identifying information received by the registration receiving unit in the peripheral device identifying information storing unit when the registration request information is transmitted to the server. Further, the service information forward control unit may identify the peripheral device to which the service information is transmitted based on the peripheral device identifying information stored in the peripheral device identifying information storing unit when the service information is received from the server, the service information forward control unit transmitting the service information to the identified peripheral device.

According to the above configuration, the peripheral device the user intends to register can be explicitly designated. Therefore, an erroneous transmission due to wrong information registered in the terminal device can be prevented.

The input image may be configured such that the user manually inputs information for identifying the peripheral device (i.e., IP address assigned to the peripheral device). In such a case, however, the user is required to know such information in advance, which may cause a smooth input of such information. If the input image is configured such that the user can easily input necessary information even if the user doesn't know the identifying information correctly.

According to aspects of the invention, the terminal device may include a searching unit that searches the peripheral device with which the terminal device communicating unit can communicate in accordance with a predetermined condition, and the displaying unit displays information regarding the peripheral device searched by the searching unit as a part of the input image.

According to the above configuration, even if the user vaguely remembers the information for identifying the peripheral device, the desired device can be selected from among the plurality of pieces of information displayed on the display, which removes the burden to the user when the desired peripheral device is designated.

The service forward control unit may be configured such that, when the service information is received from the server, it is transmitted, as it is, to the peripheral device without any inquiries to the user. Alternatively, it may be configured that the service information may be transmitted to the peripheral device after inquiring of the users.

According to aspects of the invention, the terminal device may include a forward instruction receiving unit configured to receive a forward instruction from the user, and the service information forward control unit may configure a confirmation image allowing the user to confirm the service information and to display the confirmation image on the displaying unit when the service information is received from the server, the service information forward control unit transmits the service information only when the forward instruction receiving unit receives the forward instruction from the user.

Then, a case where unintended service information is transmitted to the peripheral device and stored thereat can be prevented, which improves reliability of the service usage registration, and removes the user's concern that "whether the correct service is transmitted to the peripheral device".

The image configuration information storage unit of the server may store the image configuration information of the confirmation image as an HTML file, and the service information transmission control unit of the server may transmit the image configuration information of the confirmation image together with the service information. Further, the service information forward control unit of the terminal device may configure the confirmation image based on the image configuration information transmitted from the server, the service information forward control unit transmitting the service information in accordance with a POST method in the HTML request.

According to the above configuration, the user can transmit the service information simply by depressing a button displayed on a page generated by HTML. That is, the user need not select or directly input the service information.

According to aspects of the invention, there is provided a server configured to communicate with a peripheral device capable of using a service through a network and with a terminal device capable of communicating with the peripheral device, a service registration necessary for using the service being made in the terminal device, the server providing the service to the peripheral device through the network. The server may include a server communication unit enabling the server to communicate with the peripheral device and the terminal device, a service information transmission control unit that judges whether the registration request is appropriate, when receiving the registration requesting information from the terminal device from the server device via the server communication unit, the service information transmission control unit transmitting the service information to the terminal device when the registration request is judged to be appropriate, and a service providing unit configured to communicate with the peripheral device to transmit the service via the server communication unit.

According to aspects of the invention, there is also provided a terminal device capable of communicating with a server, which provides a service through a network, and with a peripheral device, which can communicate with the server to receive the service from the server, the terminal device being used for a service registration so that the peripheral device can receive and use the service. The terminal device may include a registration information receiving unit configured to receive the registration request information for using the service, a terminal communication unit configured to communicate with the server and the peripheral device, a registration request information transmission control unit that transmits the registration request information received by the registration information receiving unit to the server via the terminal device communication unit, and a service information forward control unit configured such that, when the service information is received via the terminal communication unit, the service information forward control unit transmits the service information to the peripheral device via the terminal device communication unit.

According to further aspects of the invention, there is provided a peripheral device capable of communicating with a server that provides a service through a network and a terminal device to be used for service registration to use the service provided by the server, the peripheral device being capable of using the service. The peripheral device may further include a peripheral device communicating unit enabling communication with the server and the terminal device, an information storage unit, a service information registration control unit configured such that, when the service information is received from the terminal device through the peripheral device communicating unit, the service information registration control unit stores the received service information in the information storing unit, and a service realizing unit that communicates with the server via the terminal device communicating unit based on the service information stored in the information storing unit.

According to further aspects, there is provided a computer program product comprising computer readable instructions which cause a computer to function as the above-described server, terminal device and/or peripheral device.

Illustrative Embodiments

Hereinafter, referring to the accompanying drawings, an illustrative embodiment will be described.

Entire Configuration

FIG. 1 shows a configuration of a service providing system according to an illustrative embodiment of the invention. As shown in FIG. 1, the service providing system includes an MFP (Multi Function Peripheral) 10, a directory server 20, a function server 30, a PC (Personal Computer) 60, etc., which are interconnected to each other so that data communication can be performed via a network 1. According to this illustrative embodiment, the network 1 may be a WAN (Wide Area Network) such as the Internet. Specifically, the MFP 10, the directory server 20, the function server 30 and PC 60 are connected to the network 1, respectively, via the routers 2 to 4. In this illustrative embodiment, the routers are known broadband routers.

The MFP 10 includes, as shown in FIG. 1, a control unit 11, an operation unit 12, a reading unit 13, a recording unit 14, a communication unit 15, a storage unit 16, a sound input unit 17, a sound output unit 18, etc. The control unit 11 includes CPU, ROM, RAM, etc., and the CPU of the control unit 11 controls the entire operation of the MFP 10 in accordance with programs stored in the ROM of the control unit 11.

In addition, the operation unit 12 serves as a user interface, which includes a copy key 41, a scanner key 42, a FAX key 43, a service key 44, a setting key 45, up/down/right/left direction keys 46 to 49, an OK key 50 and a cancel key 51, a user interface such as a display 52, etc.

In FIG. 1, the reading unit 13 is an input device for realizing a function of a scanner. That is, the reading unit 13 reads an image formed (e.g., printed) on a sheet-type recording medium (e.g., paper) and generates image data representing the image.

The recording unit 14, which is an output device for realizing the printer function, prints out the image represented by the image data onto a sheet-type recording medium such as paper.

The communication unit 15 connects the MFP 10 to the network 1, and also performs processes for transmitting/receiving data via the network 1.

The storage unit 16 includes a nonvolatile RAM (not shown) in which input/output data can be recorded.

The sound input unit 17 receives sound through a microphone provided to a handset (not shown), which is included in the MFP 10, and generates sound data (e.g., PCM data) corresponding to the received sound.

The sound output unit 18 outputs the sound represented by the sound data (e.g., PCM data) with a speaker provided to the handset or a speaker (not shown), which is provided to a main body of the MFP 10.

The directory server 20 includes a control unit 21, communication unit 22, and a storage unit 23. The control unit 21 includes CPU, ROM, RAM, etc., and the CPU controls the entire operation of the directory server 20 in accordance with the program stored in the ROM.

The communication unit 22 connects the directory server 20 to the network 1 and also performs processes for transmitting/receiving data via the network 1.

The storage unit 23 includes a hard disk drive (not shown), in which data is stored. A service definition information storage unit 24 for recording service definition information 25, which will be explained later, is provided in the storage unit 23. This service definition information 25 is XML (eXtensible Markup Language) data described in XML and can provide a list of services (e.g., type and request destination address (URL: Uniform Resource Locator) of each service) which can be provided by function server 30 through a service selection window (refer to FIG. 10A) in accordance with the content of the XML data. Respective tag definitions in the service definition information 25 are shown in FIG. 3.

The function server 30 includes a control unit 31, a communication unit 32, a storage unit 33, etc. The control unit 31 includes CPU, ROM, RAM, etc., and the CPU controls the entire operation of the function server 30 in accordance with programs stored in the ROM. Compared with the control unit 11 of MFP 10, the control unit 31 is configured to realize a sufficiently high performance and is capable of performing processes which could not be executed by the control unit 11.

The communication unit 32 connects the function server 30 to the network 1 and also performs processes for transmitting/receiving data via the network 1.

The storage unit 33 includes a hard disk drive (not shown) in which data is stored. The memory part 33 includes a service I/F information storage unit 34 for storing service I/F information 36, and a service software storage unit 35 for storing service software 37 which performs processes for providing different services. This service I/F information 36 is XML data described in XML. A parameter input window (described later) is displayed on the MFP 10 (see FIG. 16) with the I/F information 36, thereby an interface is realized for setting information (service content and request destination address) to be used for requesting the function server 30 to provide the service.

Respective tag definitions in this service I/F information 36 are indicated in FIG. 4.

The PC 60 includes a control unit 61, an operation unit 62, a storage unit 64 and a communication unit 65.

The control unit 61 is provided with a CPU, a ROM and a ROM (not shown), and the CPU controls the entire operation of the PC 60 in accordance with programs stored in the ROM. The operation unit 62 includes well-known keyboard and mouse. The display unit 63 is provided with a CRT (Cathode Ray Tube) or an LCD (Liquid Crystal Display). The storage unit 64 is provided with a non-volatile storing medium such as a hard disk, and configured to store input data and/or data to be output. The communication unit 65 connects the PC 60 with the network 1, and performs data transmitting/receiving operations via the network 1.

Mechanism for Registering Service

Hereinafter, a pre-process enabling the MFP 10 to use the service provided by the function server will be described. In the pre-process, information related to the user is registered with the functional server 30, and service information necessary for the MFP 10 to make use of the service is stored in the MFP 10.

(1) General Description on the Preprocess

Figure 26:
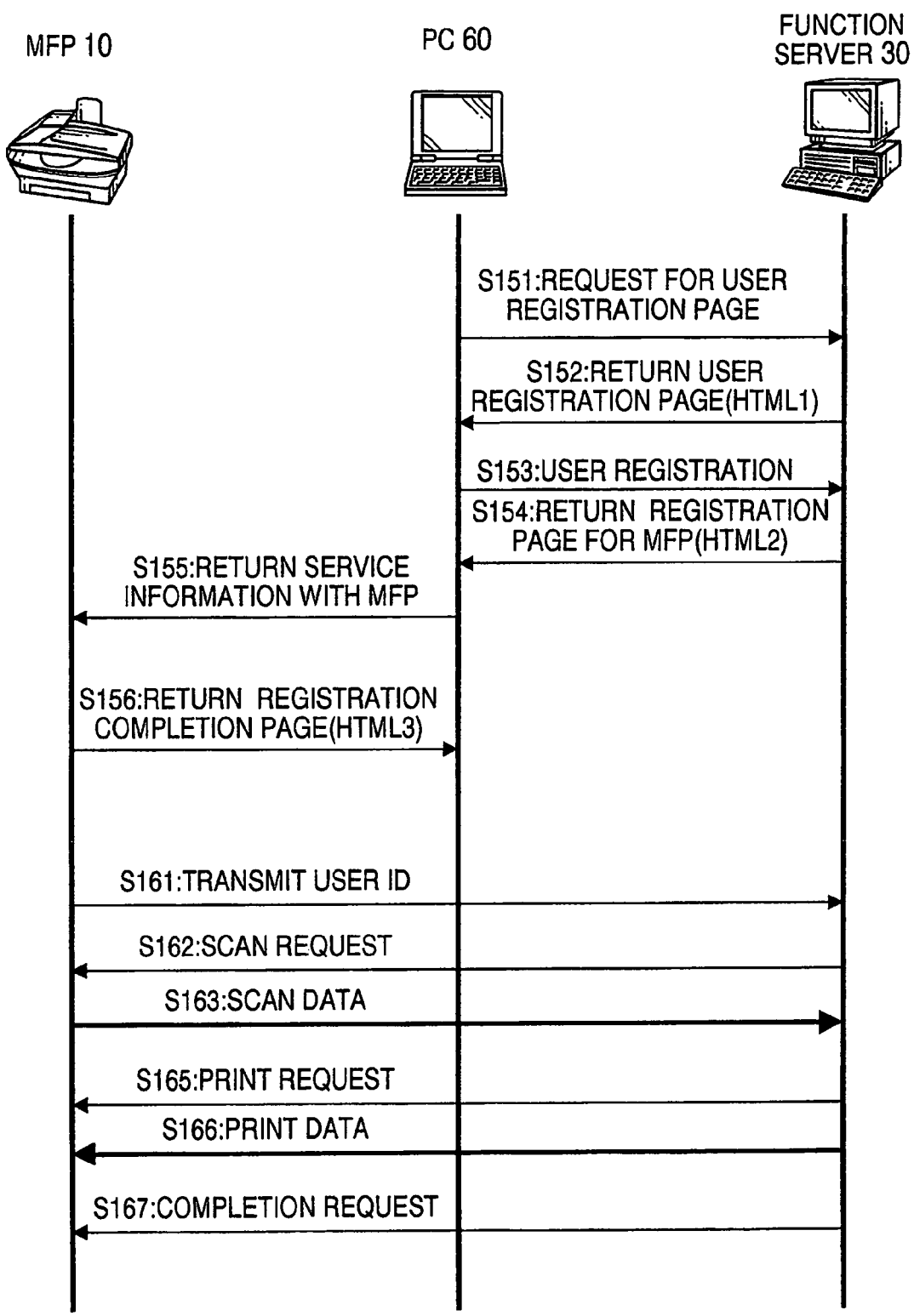
FIG. 26 is a ladder chart illustrating a mechanism for registering service information according to aspects of the invention.

FIG. 26 is a ladder chart illustrating the mechanism for the registration of information regarding the user.

The user requests the function server 30 to display a user registration page (S151). Specifically, in S151, a certain browser is started up in the PC 60. Then, the user inputs a URL of the function server 30 in an address input field of the browser or the URL of the browser or selects the URL from a bookmark list.

In S152, the user registration page (HTML1 described later) is returned from the function server 30. When the user registration page is received, the PC 60 displays the registration page as received on the display unit 63, thereby requesting the user to input necessary items (e.g., types of a service to be registered, a user ID, a password, etc.).

When the user has finished inputting the necessary items and depresses a transmission button (i.e., a submit button), the input information is transmitted to the function server 30 (S153). Then the input user information is registered with function server 30. The user registration according to the illustrative embodiment is the operation data indicating that the user can use the service.

When the user registration has been done in the function server 30, a page (i.e., HTML2, which will be described later) including the service information that is the information necessary for using the service is transmitted to the PC 60 (S154). When received the page including the service information, the PC 60 displays the page on the display unit 63 in order to ask the user to check the registered content and depress the submit button for confirmation.

When the user depresses the submit button, the service information is transmitted to the MFP 10 (S155), and the MFP 10, which receives the service information, stores the service information in the storage unit 16.

In accordance with the above process, the user information is registered with the function server 30, and the service information necessary for using the service is stored in the MFP 10. Additionally, a registration completion page (e.g., in HTML format) may be returned from MFP 10 to PC 60 (S156) after registration of the service information with MFP 10.

Next, a process to be executed when the MFP 10 uses the translation copy service in accordance with the service information will be described. The translation copy service is a service in which a document having text to be translated is scanned by the MFP 10, and a document having translated text is output from the MFP 10.

If the user of the MFP 10 selects the translation copy service, the MFP 10 transmits the user ID among the pieces of service information to the server providing the translation service (in this illustrative example, the server 30) in S161.

When receiving the user ID, the function server 30 judges whether the received user ID represents a user authorized to use the service in S162. If it is determined that the user can user the service, the function server 30 transmits a scan request to the MFP 10 in S162.

When received the scan request, the MFP 10 asks the user to start scanning a document, and transmits the scan data which is generated by scanning the document to the function server 30 (S163).

The function server 30 that has received the scan data extracts text information from the scan data and performs translation of the extracted text, and transmits the result of translation as print data together with a print request to the MFP 10 (S165 and S166).

When the print request and print data is received, the MFP 10 performs the printing operation in accordance with the received print data to output the translation result.

The function server 30 transmits a completion request to the MFP 10 (S167), and the MFP 10, when the completion request is received, finishes the program executing the translation copy service.

Next, processes respectively executed by the PC 60, the function server 30 and the MFP 10 will be described.

(2) Process Executed by the PC 60

Figure 27:
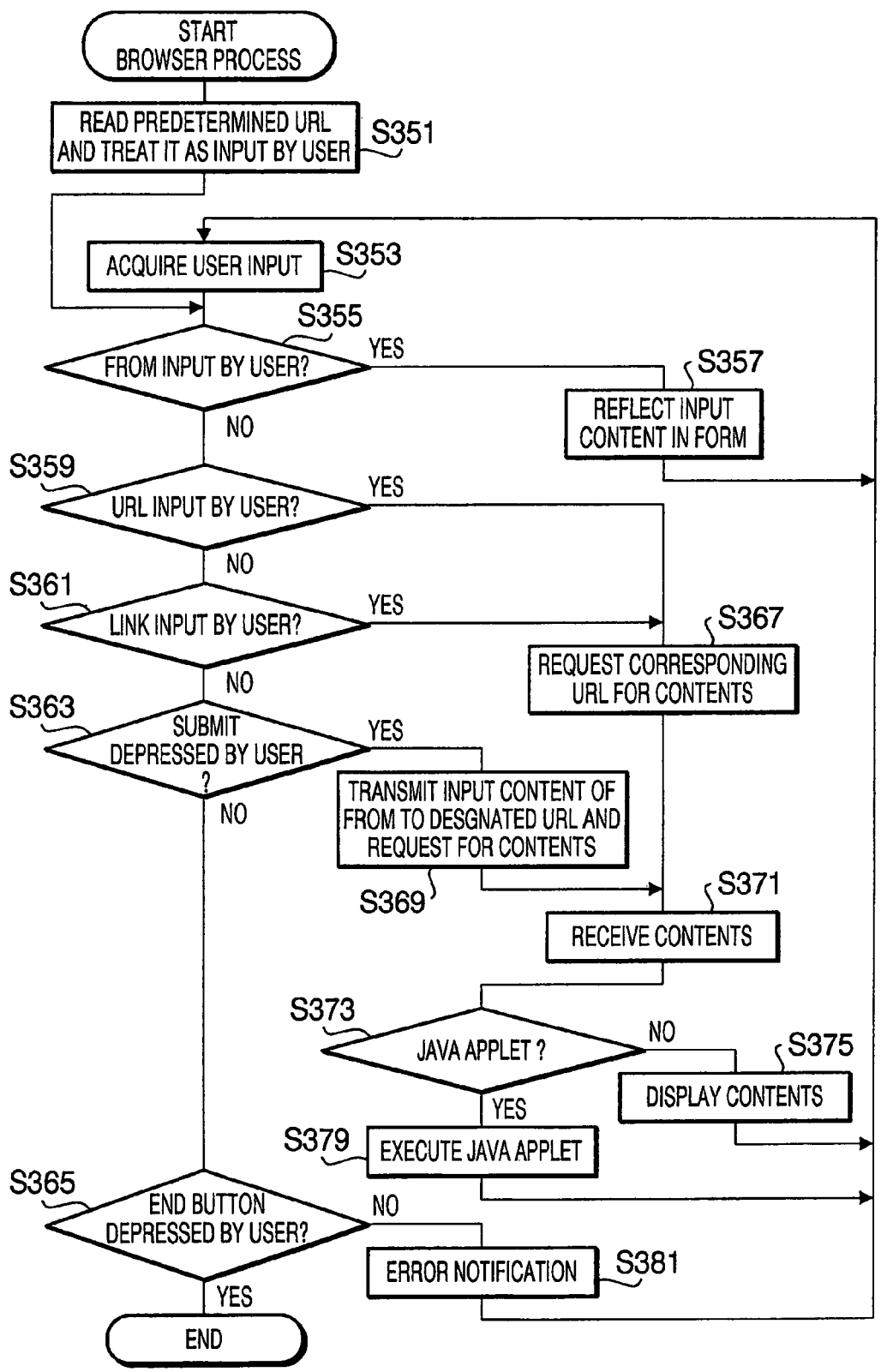
FIG. 27 is a flowchart illustrating a browser process executed by the PC according to aspects of the invention.

FIG. 27 shows a browser process executed by the control unit 61 of the PC 60. The browser process is started when the user operates the operation unit 62 to input a start instruction.

When the browser process is started, the process allows a URL input (S351). The URL received in the process in S351 can be one directly input by the user in the address input field, or one the user selects from the bookmark list.

Next, the process judges whether the user has operated the operation unit 62 to input data in a form (e.g., FIG. 34A) in S355. If the process determines that the user has input data in the form (S355: YES), the input data is reflected in the form (S357), and the process is ready for a further input operation (S353). If the process receives the input by the user in S353, the process proceeds to S355.

If it is determined that the user has not input data in the form (S355: NO), the process judges whether the user input the URL by operating the operation unit 62 (S359). As described above, the user can input the URL by directly inputting the URL in the address input field, or selecting one of listed URLs from a bookmark. If it is determined that the URL has been input (S359: YES), the process requests a destination identified by the URL to provide its content (S367). It should be noted that the request for the content is done using a HTTP request in accordance with HTTP 1.1 (hereinafter, simply referred to as the HTTP request).

If it is determined that the URL has not been input, the process judges whether the user has selected a link (S361). If it is determined that the link has been selected (S361: YES), the process requests the URL designated by the selected link to provide its content by the HTTP request (S367).

If it is determined that the user has not selected the link (S361: NO), the process judges whether the user depressed the submit button (S363). If it is determined that the user has depressed the submit button (S363: YES), the process transmits the content of the form to the URL defined by the form by the HTTP request thereby initiating a requesting for its content (S369).

If it is determined that the user has not depressed the submit button (S363: NO), the process judges whether the user has depressed the end button (S365). If it is determined that the user has depressed the end button (S365: YES), the process finishes the browser process.

If it is determined that the user has not depressed the end button (S365: NO), the process displays a message indicating the occurrence of an error on the display unit 63 to indicate an error (S381), and returns to S353.

When the process has requests for the content in S367 or S369, the process receives the content transmitted, as an HTTP response (based on HTTP 1.1) from the server (i.e., the function server, according to the illustrative embodiment) to which the HTTP request has been transmitted (S371). Then, the process judges whether the received content is a JAVA® applet (S373). If the received content is the JAVA applet (S373: YES), the process executes the JAVA applet (S379), and then returns to S353.

If the received content is not the JAVA applet (S373: NO), the process displays the received content (HTML) on the display unit 63 (S375), and returns to S353.

The browser process described above is a generally used process, and transition of the process in relation to the illustrative embodiment is further described.

When the browser process is started, a URL for registering the user with the function server 30 (i.e., http://adgi.com/regispage.html) is input (S351), thereby the process requests the HTML file (S359: YES; S367).

Next, when the HTML file is designated by the above URL (S371), the process constitutes a display window based on the received HTML file, which is then displayed on the display unit 63 (S373: NO; S375).

The HTML file received in S371 (and S373: NO) is the HTML1 shown in FIG. 31. As shown in FIG. 31, in the HTML1 file, a <form> tag is used, and a window is defined in which the address of the MFP 10 to be registered, a type of service, a user name (user ID), and a password can be input or designated. Further, as a method of the <form> tag, "POST" is designated, and as a request URL thereof, "http://adgi.com/regist.cgi" is designated. The HTML file to be transmitted to the function server 30 is configured such that if the submit button is depressed, the address of the MFP 10 to be registered, the type of the service, the user name (user ID) and the password can be referred to by NAME properties ip#address, service#type, user#name, and register#password, respectively, on the server side.

Figure 34A:
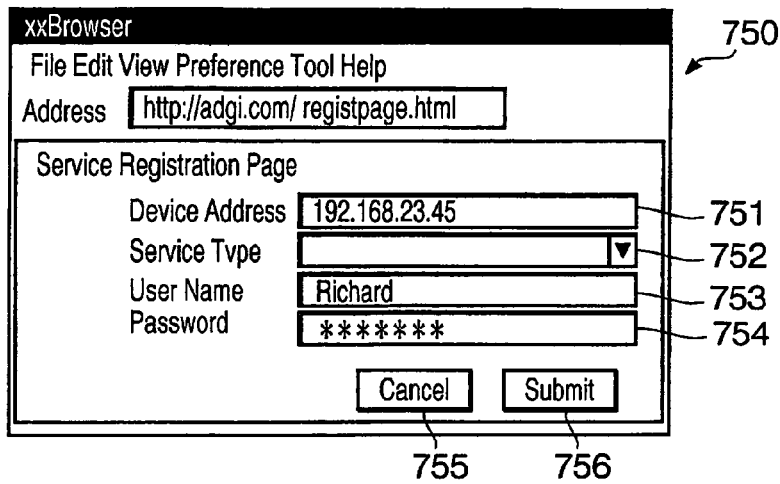
FIGS. 34A-34C and 35 show examples of windows displayed in the PC according to aspects of the invention.

FIG. 34A shows an example of the displayed window according to the HTML1. As shown in FIG. 34A, the display window 750 includes an address input field 751 for a device (of which the service information is to be registered), a selection field 752 for selecting the type of the service, a user name (user ID) input field 753, a password input field 754, a cancel button 755 and a submit button 756.

If each input field of the form is filled in by the user, the process reflects the input information on the display window (S353; S355: YES; S357). Then, if the submit button is depressed, the process transmits the input contents of the form to the function server (i.e., "http://adgi.com/regist.cgi") to request for its content (i.e., the HTML file) in S369.

As the function server 30 has transmitted the content (i.e., HTML file), which is received by the PC 60, the control constitutes a window based on the received HTML file and displays the window on the display unit 63 (S371; S373: NO; S375).

The HTML file transmitted from the function server 30 is HTML2 shown in FIG. 32. As shown inn FIG. 32, HTML2 is configured to display the address of the device input in the previous window (i.e., the MFP 10), the name of the service, and the user name. Further, the <form> tag is used and service information ("userID"="Richard", "imfcsessionControlRequestUrl"="http//adgi.com/sessionControl.cgi", "imfcDisplayNameForBookMark"="Regist") is described as hidden information.

Figure 34B:
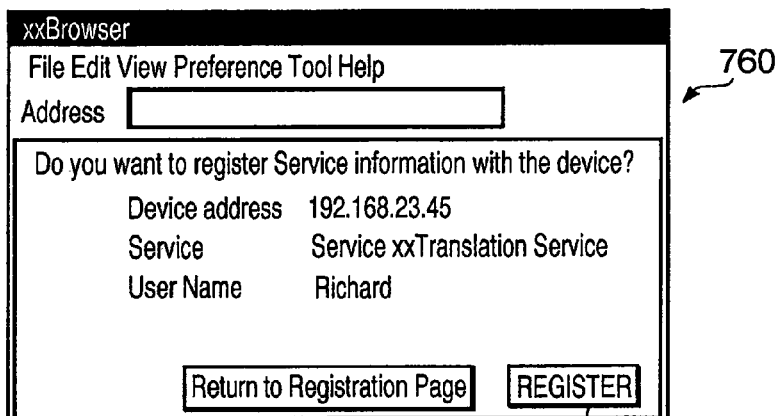

FIG. 34B shows an exemplary display window 760. As shown in FIG. 34B, the display window 760 includes a message inquiring whether the service information is to be registered with the device (MFP 10), the address of the device, the service name, the user name, and a registration button 761, which is referred to in the above description as the submit button.

In FIG. 27, if the registration button 761 is depressed, the process determines that the user has depressed the submit button (S363: YES), and transmits the service information to the MFP 10 (S369).

As a result, the service information is registered with the MFP 10, and then content (i.e., an HTML file) including the result of the registration is returned from the MFP 10 (S371). The process then configures a display window based on the received HTML file and display the same on the display unit 63 (S375).

Figure 34C:
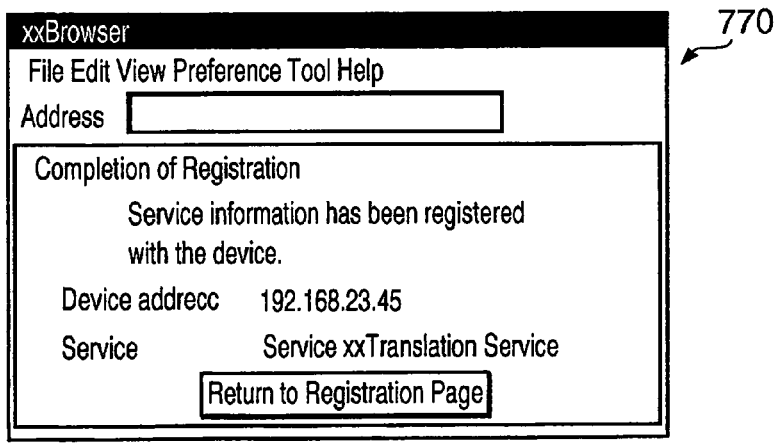

The HTML file transmitted from the MFP 10 is HTML3 shown in FIG. 33. As shown in FIG. 33, the HTML3 is configured such that a message indicating the completion of registration is displayed. FIG. 34C shows a display window which is configured based on the HTML3. As shown in FIG. 34C, the display window 770 shows a message indicating the completion of registration.

(3) Processes Executed by Function Server 30

Next, a Web response process and a user registration process executed by a control unit 31 of the function server 30 will be described.

(3-1) Web Response Process

Figure 28:
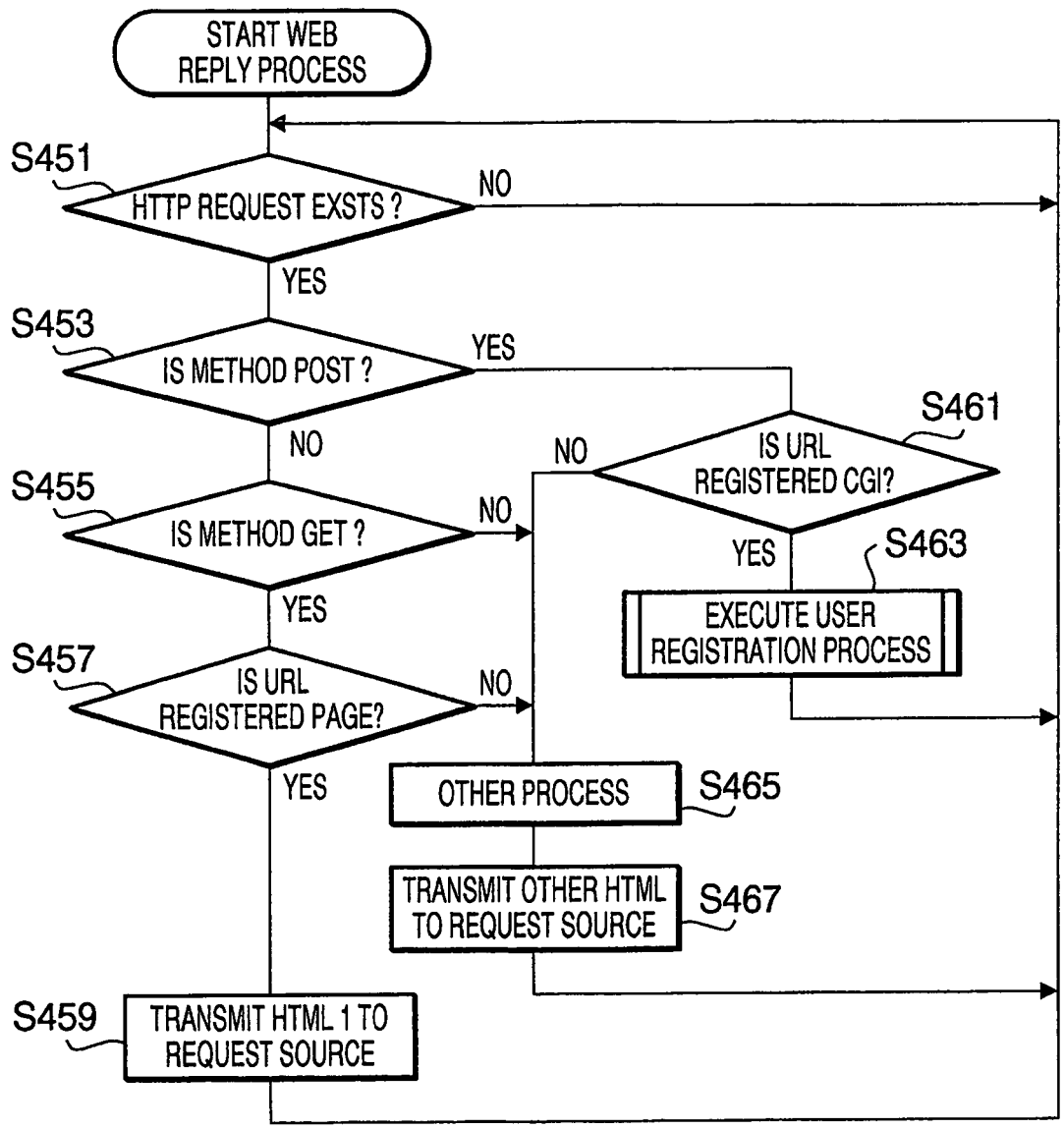
FIG. 28 is a flowchart illustrating a Web reply process executed by the function server according to aspects of the invention.

FIG. 28 shows a flowchart illustrating the web response process, which is started when the function server 30 is powered ON.

When the web response process is started, the process judges whether there is an HTTP request received from an external device (S451). If the HTTP request has been received from the external device (S451: YES), the process judges whether the method of the HTTP request is POST (S453). If the method of the HTTP request is POST (S453: YES), the process judges whether a URL request of the HTTP request designates a CGI program for service registration (S461). That is, it is judged whether the URL request of the HTTP request is "http://adgi.com/regist.cgi". If the URL request designates the CGI program for the service registration (S461: YES), the process executes the user registration process (S463), described later, and after execution of S463, the process returns to S451.

If the URL request of the HTTP request does not designate the CGI program for the service registration (S461: NO), the process executes another CGI program designated by the URL request for another process (S465). Thereafter, the process transmits an HTML file generated by the other process to the external device from which the HTTP request was received as the HTTP response (S467), and the process returns to S451.

If it is determined that the method of the HTTP request is not POST (S453: NO), the process judges whether the method of the HTTP request is GET (S455). If it is determined that the method of the HTTP request is not GET (S455: NO), the process executes a process according to the type of the method (S455), and transmits a resultant HTML file, as the HTTP response, to the external device from which the HTTP request was received (S467). Then, the process returns to S451.

If it is determined that the method of the HTTP request is GET (S455: YES), the process judges whether the URL request of the HTTP request is a service registration page, "http://adgi.com/registpage.html" (S457). If the request URL is the service registration page (S457: YES), the process transmits the HTML1 shown in FIG. 31 to the external device from which the HTTP request was received (S459), and the process returns to S451.

If the URL request is not the service registration page (S457: NO), the process retrieves a file corresponding to the URL request from the storage unit 33 (S465), and transmits the retrieved file to the external device from which the HTTP request was received (S467). Then, the process returns to S451.

(3-3) User Registration Process

Figure 29:
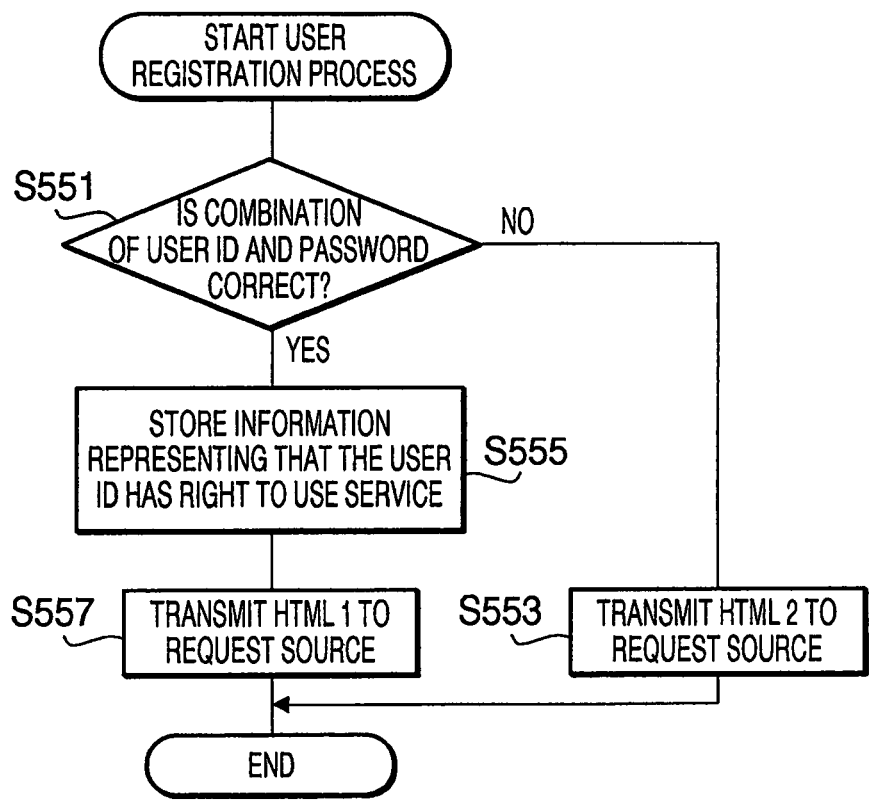
FIG. 29 is a flowchart illustrating a user registration process executed by the function server according to aspects of the invention.

FIG. 29 shows a flowchart illustrating the user registration process which is executed at S463 of FIG. 28.

In the user registration process, the process first judges whether a combination of the user ID (user#name) and the password (register#password) transmitted together with the HTTP request is included in a list stored in the storage unit 33 (S551). It should be noted that, the judgment is made taking into account the type of the service (service#type) transmitted together with the HTTP request. If the combination of the user ID (user#name) and the password (register#password) transmitted together with the HTTP request is included in the list (S551: YES), the information is stored in the storage unit 33 since the user of the user ID has the right to use the service (S555). Then, the process transmits the HTML2 to the device from which the HTTP request was received (see FIG. 32), and finishes the user registration process. Then, the process returns to a step following S463 of FIG. 28.

If the combination of the user ID (user#name) and the password (register#password) transmitted together with the HTTP request is not included in the list (S551: NO), the process transmits the HTML1 (see FIG. 31) to the external device from which the HTTP request was received (S553), finishes the user registration process, and returns to a step following S463 of FIG. 28.

(4) Process Executed by MFP 10

Figure 30:
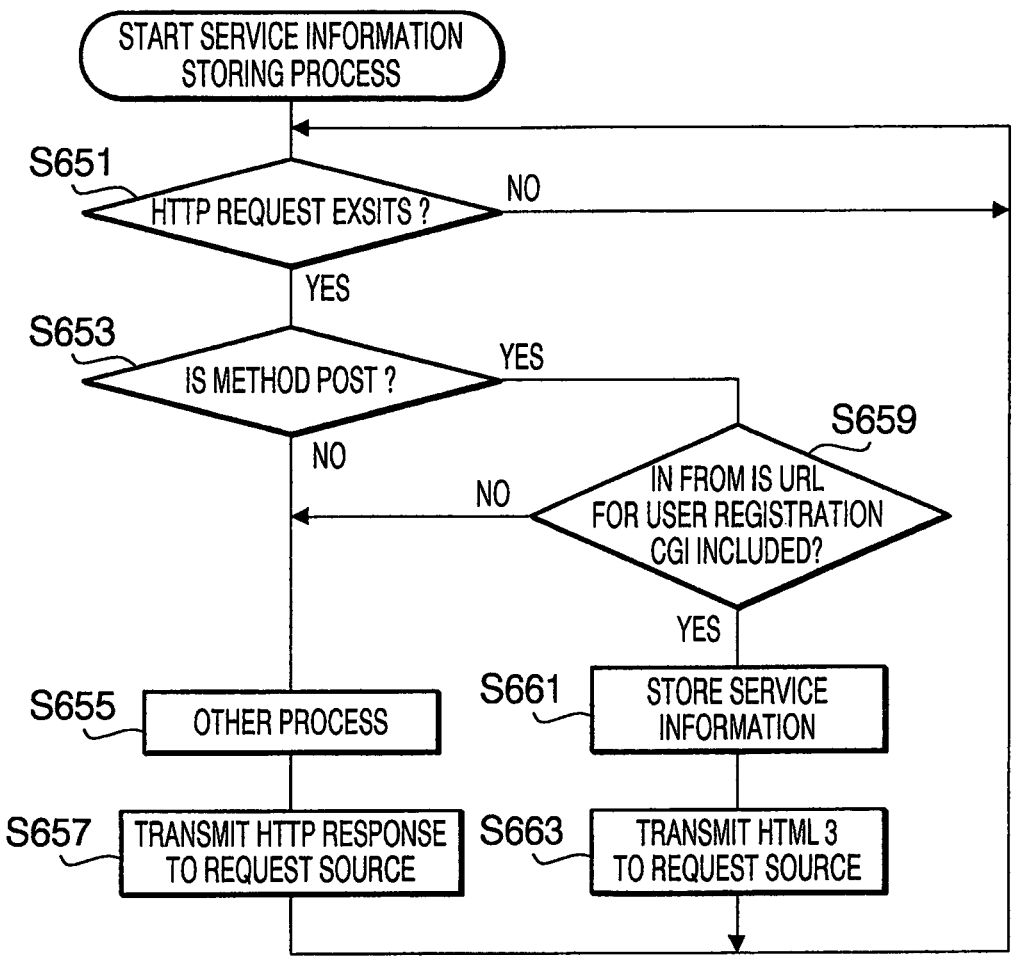
FIG. 30 is a flowchart illustrating a service information storing process executed by the MFP according to aspects of the invention.

Next, a service information storing process executed by the control unit 11 of the MFP 10 will be described referring to FIG. 30. The service information storing process is executed when the MFP 10 is powered ON.

When the service information storing process is started, the process judges whether there is an HTTP request received from another device (S651). If no HTTP requests have been received from another device (S651: NO), the process repeats the judgment at S651 until it receives the HTTP request from another device.

If there is an HTTP request received from another device (S651: YES), the process judges whether the method of the HTTP request is POST (S653). If the method of the HTTP request is not POST (S653: NO), the process executes a process corresponding to the method (S655), transmits a resultant HTTP response to the device from which the HTTP request was received (S657), and returns to S651.

If it is determined that the method of the HTTP request is POST (S653: YES), the process judges whether form information (i.e., the service information) transmitted together with the HTTP request includes a URL designating the user registration CGI (S659). That is, in S659, the process judges whether the data of the property of the data (NAM="imfcsessionControlRequestUrl") transmitted together with the HTTP request is "http://adgi.com/session-Control.cgi". If it is determined that the URL designating the user registration CGI is included in the form information transmitted together with the HTTP request, the process stores the form information (service information) transmitted together with the HTTP request in the storage unit 16 (S661), and transmits the HTML3 shown in FIG. 33 to the device from which the HTTP request was received (i.e., the PC 60) in S663. As shown in FIG. 33, the HTML3 is for displaying a message indicating the completion of the service registration. FIG. 34C shows a display window which is displayed based on the HTML3. As shown in FIG. 34C, the display window 770 includes messages having the address of the device (i.e., the MFP 10) and the type of the service. It should be noted that the service information stored in the storage unit 16 is used in a session process (see FIG. 12) described later. After transmitting the HTML3, the process returns to S651.

Mechanism for Providing Service

Figure 5:
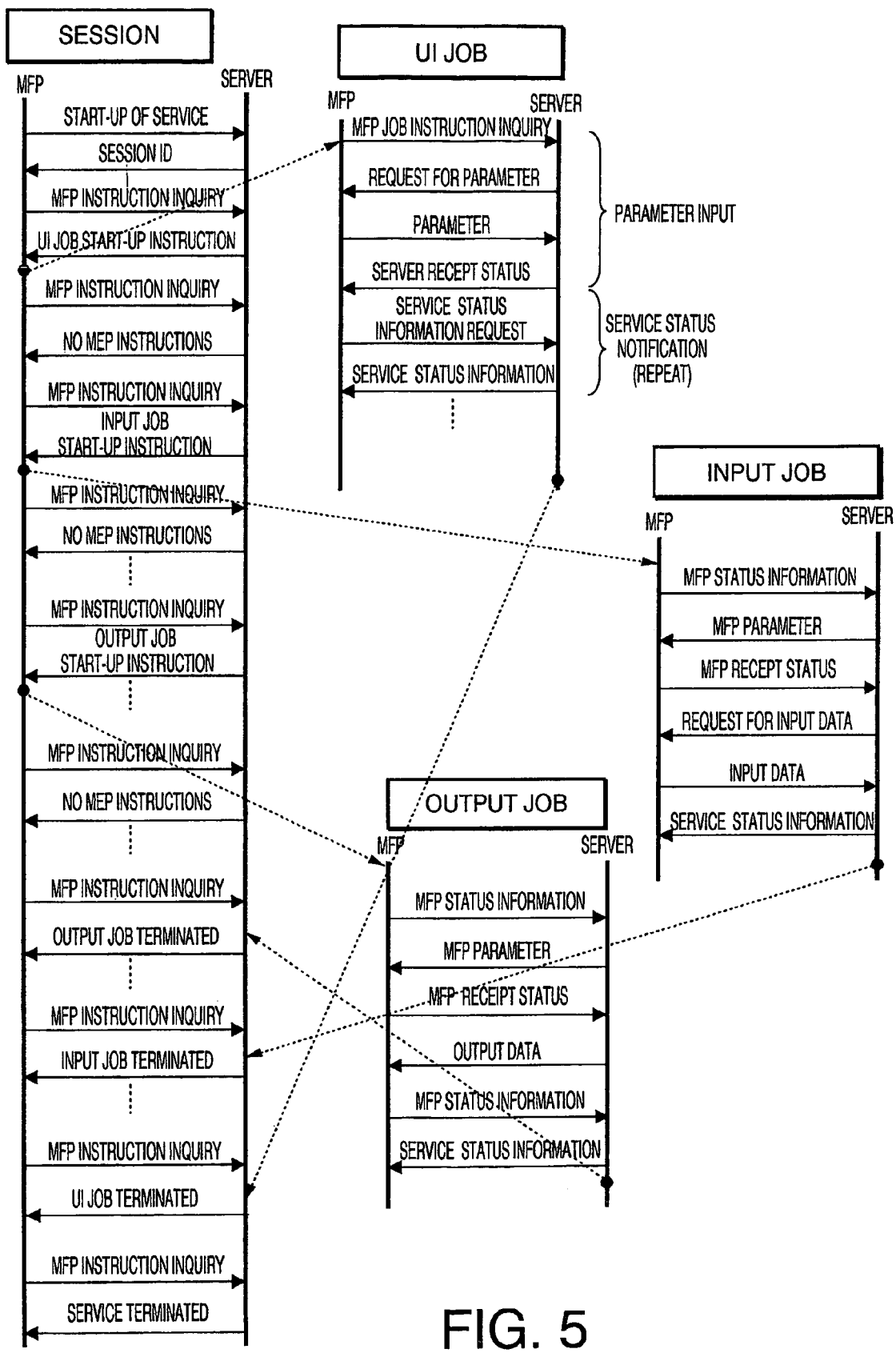
FIG. 5 is a ladder chart showing an example of a communication between an MFP and a function server according to aspects of the invention.

Next, an example of a communication performed between the MFP 10 and the function server 30 when the service is provided will be described with reference to a ladder chart shown in FIG. 5.

The MFP 10 and the function server 30 execute a series of communication processes (which will be referred to as a session) from the start-up of the service to the end of the service. In the session, the MFP 10 requests the function server 30 to start up the service. Then, the function server 30 transmits a session ID to the MFP 10. The session ID is an identifier to specify a session in the function server 30. In the following communication process, the MFP 10 transmits the session ID in response to a request, and the function server 30 identifies the session based on the session ID. With this configuration, the function server 30 is capable of handle multiple sessions at the same time.

After receipt of the session ID, the MFP 10 periodically executes an inquiry for an instruction to the MFP 10, and receives the instruction in the form of a reply from the function server 30. It should be noted that the function server 30 transmits a reply indicating that there are no instructions to the MFP 10 if there are no instructions to be transmitted to the MFP 10.

In the above case, the function server 30 first transmits a UI (User Interface) job start-up instruction to the MFP 10. The UI job start-up instruction indicates that a UI device (e.g., the operation unit 12) provided to the MFP 10 is started to be used. Thus, a UI job communication process is started between the MFP 10 and the function server 30. The UI job communication process is executed in parallel with the session. Further, from the function server 30 to the MFP 10, a job ID, which is an identifier intrinsic to each session and which identifies a job at the function server 30, is transmitted as the UI job start-up instruction is issued. Then, the MFP 10 transmits the session ID and job ID in accordance with the request in the UI job communication process. The function server 30 identifies the job based on the session ID and job ID. With this configuration, it becomes possible that the function server 30 executes multiple jobs at the same time. As above, the function server 30 can process multiple jobs at the same time. The communication process in the UI job will be described later.

Next, the function server 30 transmits an input job start-up instruction to the MFP 10 at a predetermined timing. It is noted that the input job startup instruction indicates start-up of using an input device (i.e., the reading unit 13 or the sound input unit 17) provided to the MFP 10. Then, between the MFP 10 and the function server 30, the input job communication process is started. Similar to the UI job process, the input job communication process is executed in parallel with the session. Further, as the input job start-up instruction is transmitted, the job ID is transmitted from the function server 30 to the MFP 10. The MFP 10 then transmits the session ID and job ID in response to the request in the input job communication process. The function server 30 identifies a job based on the session ID and the job ID. The input job communication process will be described later.

Next, the function server 30 transmits, at a predetermined timing, an output job start-up instruction to the MFP 10. The output job start-up instruction indicates usage of an output device (e.g., the recording unit 14 or the sound output unit 18) provided to the MFP 10. With this configuration, between the MFP 10 and the function server 30, an output job communication process is started. Similar to the UI job and input job, the output job communication process is executed in parallel with the session. Further, the job ID is transmitted in association with the output job start-up instruction from the function server 30 to the MFP 10. Then, the MFP 10, in the output job communication process, transmits the session ID and job ID in response to the request. Then, the function server 30 identifies the job based on the session ID and the job ID. The output job communication process will be described later.

Next, the function server 30 transmits, at a predetermined timing, an output job end instruction which is for notifying of end of output job to the MFP 10. Then, the function server 30 transmits, at the predetermined timing, an input job end instruction which is for notifying of end of input job to the MFP 10.

Then, the function server 30 transmits, at a predetermined timing, a UI job end instruction indicating the end of the UI job to the MFP 10. Further, the function server 30 transmits, at a predetermined timing, a service end instruction indicating the end of the service to the MFP 10.

Next, the UI job communication process will be described.

In the UI job communication process, firstly, the MFP 10 transmits to the function server 30 the MFP job instruction inquiry which is an inquiry regarding an instruction to the MFP 10. Then, the function server 30 transmits a parameter request to the MFP 10. The parameter request is for allowing a user of the MFP 10 to set parameters necessary for performing a service. From the function server 30 to the MFP 10, in association with the parameter request, service I/F information 36 is also transmitted.

The MFP 10 displays a parameter input window on the display 52 of the operation unit 12 (e.g., FIG. 16) in accordance with the service I/F information 36 upon receipt of the parameter request from the function server 30.

The function server 30 transmits a server receipt status, which represents whether the function server 30 has successfully received the information from the MFP 10, upon receipt of the parameter(s) from the MFP 10.

If the MFP 10 recognizes that the function server 30 has successfully received the parameter(s) based on the server receipt status received from the function server 30 the MFP 10 request the function server 30 for a service status information request.

When the function server 30 receives the service status information request from the MFP 10, it transmits the service status information which is a notification of the status of the function sever 30 and its service status. Thereafter, the request for the service status information and the response thereto (i.e., transmission of the service status information) are repeated.

Next, the input job communication process will be described.

In the input job communication process, the MFP 10 transmits MFP status information to the function server 30. Then, the function server 30 transmits MFP parameters to the MFP 10. The MFP parameters are parameters for the input device that have been set by the user of the MFP 10 in the UI job communication process.

The MFP 10, upon receipt of the MFP parameters from the function server 30, transmits MFP receipt status to the function server 30 representing whether the MFP 10 has successfully received the information from the function server 30.

If the function server 30 recognizes that the MFP 10 has successfully received the information based on the MFP receipt status transmitted from the MFP 10, it transmits an input data request which requests the MFP 10 to transmit the input data corresponding to the job. The input data corresponding to the job includes: image data created in the reading unit 13 for a scan job that is a job executed in the service related to the image data generated in the reading unit 13, and PCM data for a sound input job that is a job executed in the service related to the sound data representing the sound to be output from the sound input unit 17.

The MFP 10 displays an image allowing the user to execute an input operation (e.g., the image reading operation, the sound input operation or the like) when it receives the input data request from the function server 30, and transmits the resultant input data to the function server 30.

Upon receipt of the input data from the MFP 10, the function server 30 transmits the service status information representing the status of the function server 30 and the service.

Next, the output job communication process will be described.

In the output job communication process, the MFP 10 transmits the MFP status information to the function server 30. Then, the function server 30 transmits the MFP parameters to the MFP 10. The MFP parameters are parameters for the output device that have been set by the user of the MFP 10 in the UI job communication process.

When the MFP parameters are received from the function server 30, the MFP 10 transmits the MFP receipt status to the function server 30 indicating whether the MFP 10 has successfully received the information from the function server 30.

When the function server 30 has recognized that the MFP 10 has successfully received the information based on the MFP receipt status, it transmits the output data to the MFP 10. The output data above may include: image data for the print job (i.e., a job executed in the service related to the image data representing the image to be printed by the recording unit 14); and the PCM data for the sound output job (i.e., a job executed in the service related to the PCM data representing the sound to be output by the sound output unit 18).

When the output data is received from the function server, the MFP 10 executes an output operation (i.e., printing of an image, outputting of sound and the like) based on the output data. Then, the MFP 10 transmits MFP status information to the function server 30.

Upon receipt of the output data of the function server 30, the MFP 10 executes output process based on the output data (e.g., printing of the image, sound output, or the like). Then, the MFP 10 transmits the MFP status information to the function server 30.

When the MFP status information is received from the MFP 10, the function server 30 transmits the service status information to the MFP 10 indicating the status of the function server 30 and the service.

Next, processes respectively executed by the control units 11, 21 and 31 of the MFP 10, directory server 20 and the function server 30 will be described.

(1) Process by the Directory Server

Figure 6:
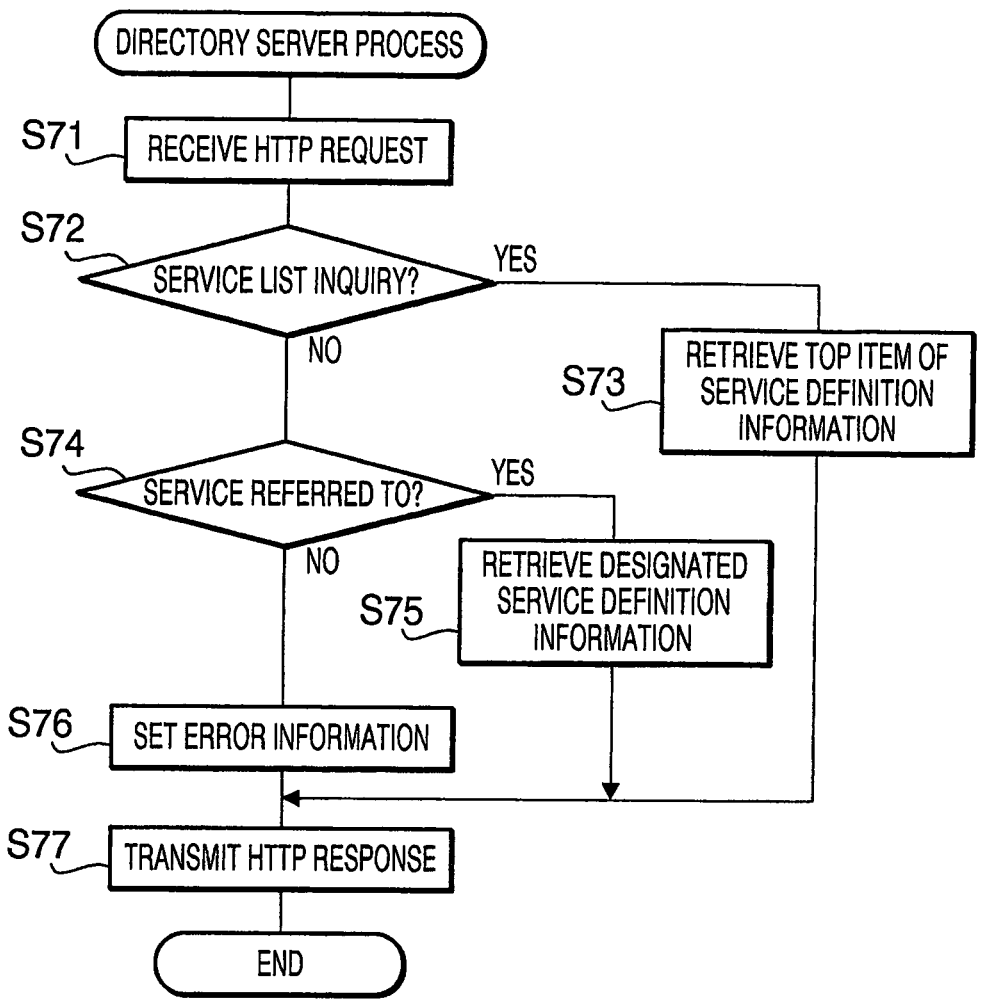
FIG. 6 is a flowchart illustrating a directory server process according to aspects of the invention.

Firstly, a directory server process which is executed by the control unit 21 of the directory server 20 will be described referring to FIG. 6.

The directory server process is started when an HTTP request is issued by the MFP 10. In S71, the process receives the HTTP request. In S72, the process judges whether the contents of the received HTTP request is for a list of the services. If the contents of the HTTP request is for the list of the services (S72: YES), the process retrieves the top of the service definition information 25 from the service definition storage unit 24 (S73), and proceeds to S77.

If the contents of the HTTP request do not refer to the list of the services (S72: NO), the process judges whether the contents of the HTTP request refer to the services (S74). If the contents of the HTTP request refer to the services (S74: YES), the process retrieves the service definition information 25 as designated from the service definition storage unit 24 (S75), and proceeds to S77.

If the contents of the HTTP request do not refer to the service (S74: NO), the process sets error information (S76), and proceeds to S77.

In S77, the process transmits the service definition information 25 or the error information to the MFP 10 from which the HTTP request was received as the HTTP response, and finishes the directory server process.

(2) Process Executed by MFP

Next, processes performed by control unit 11 of the MFP 10 will be described.

(2-1) MFP Process

Figure 7:
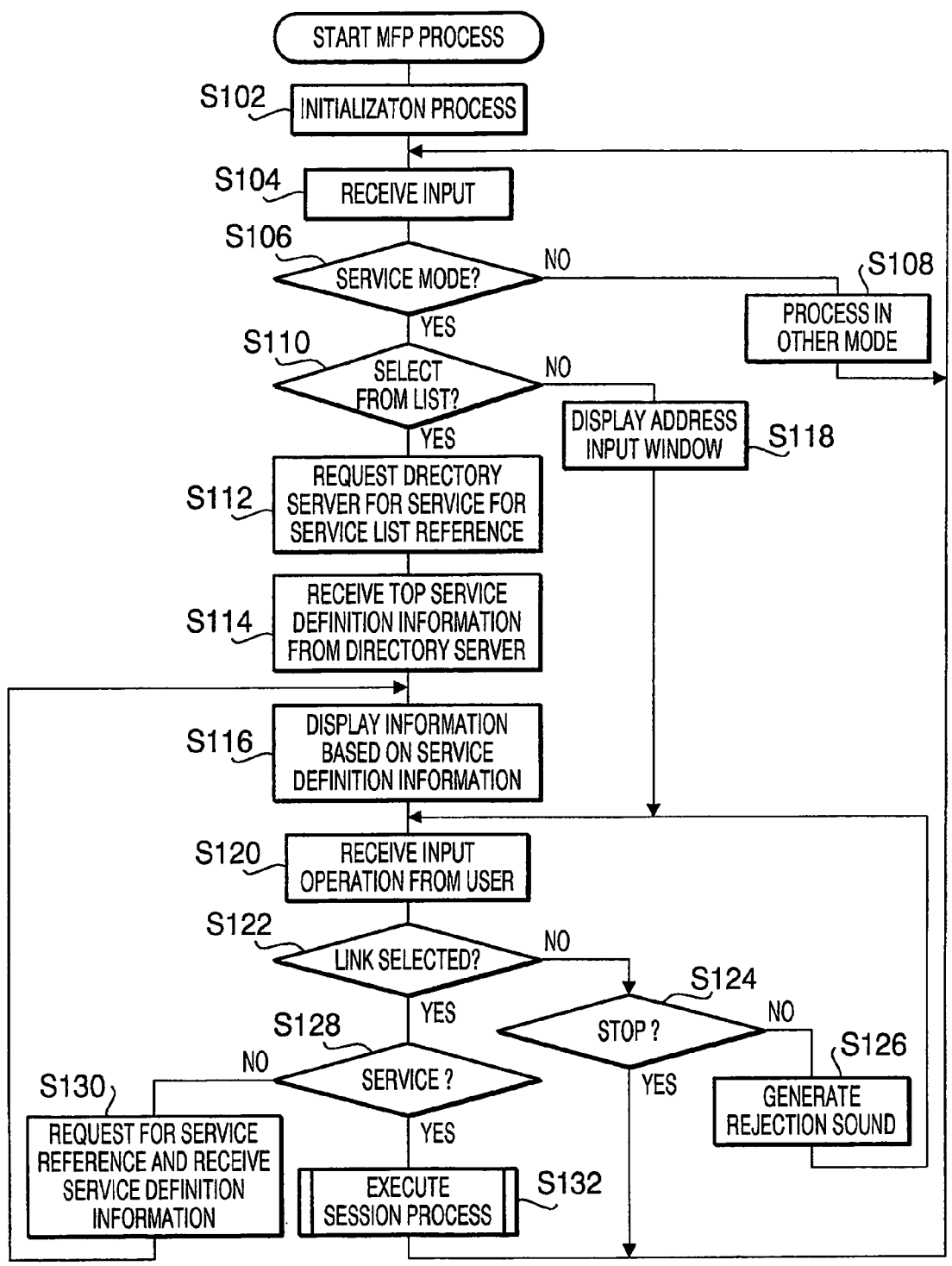
FIG. 7 is a flowchart illustrating an MFP process according to aspects of the invention.

First, an MFP processing which is repeatedly performed after MFP 10 has been booted is explained, referring to FIG. 7.

When the MFP process has been booted, initialization processing is performed (S102). After completion of the initialization process, if an instruction from an external source is generated, for example, an input operation using the operation unit 12 or an input of instruction signals via the network 1 (S104), whether the content of the input is for changing the operation mode to a service mode is judged (S106). In this illustrative embodiment, when the service key 44 of the operation unit 12 is depressed, it is determined that the input instruction is for changing the operation mode to the service mode. As will be described later, the "service mode" is to request the function server 30 to provide a service.

If it is determined in S106 that the content does not call for change to service mode (S106: NO), the process is returned to S104 after performing a process for another operation mode according to the input content (S108).

If it is determined in S106 that the content is for the change to the service mode (S106: YES), the process allows the user to select a method for specifying the service to be requested from the function server 30 (S110). According to the illustrative embodiment, a method selection window shown in FIG. 8 is displayed on the display 52, and the user is asked to select whether to specify the service from a list ("Select from list" in FIG. 8) or by directly entering the request destination address ("Direct input" in FIG. 8). After the selection window has been displayed, the user can select either designating method using the operation unit 12.

In S110, if the designation from the list is selected (S110: YES), the process requests the directory server 20 for the top item of the service definition information 25 (S111). In this illustrative embodiment, as an address at which a request for the top item of the service definition information 25 is transmitted, the address preliminarily stored in the storage unit 16 is used, and the HTTP request is transmitted to the directory server at the address, thereby requesting a list of the services. When an access in accordance with the address is received, the directory server 20 transmits the top item of the service definition information 25 as the HTTP response, as described above.

Figure 10A:
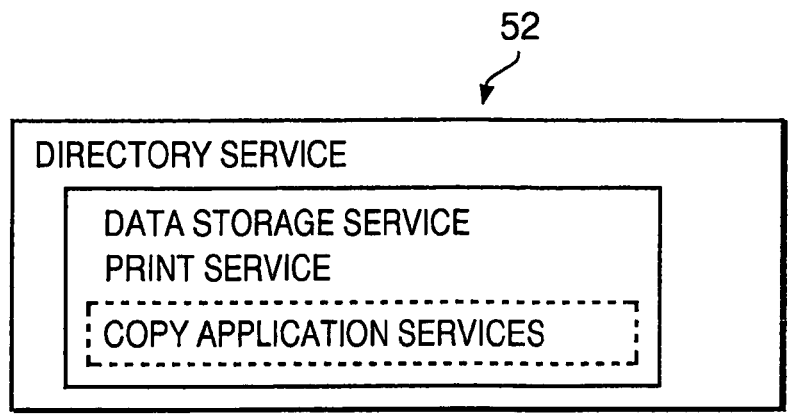
FIGS. 10A-10C show examples of a service selection window according to aspects of the invention.

After requesting for reference to the top item of the service list, when the service definition information 25 transmitted form the directory server 20 is received (S114), the process displays the service selection window on the display 25 based on the received service definition information 25 (S116). Thereafter, the process proceeds to S120. If S116 is executed after the top item of the service definition information 25 is received, a category selection window as shown in FIG. 10A is displayed based on the top item of the service definition information 25 (i.e., XML description) as shown in FIG. 9.

Specifically, in the category selection window, as a display title (Title), a character string "Directory Service" is indicated at an upper portion of a display area of the display 52, and character strings indicating selectable categories (Link_Title), i.e., "Data Storing Service", "Print Service" and "Copy Application Service" are indicated at lower portions of the display area of the display 52. To the category selection window shown in FIG. 10A, IDs of other service definition information 25 respectively corresponding to the selectable categories are assigned (see "Link_Location" of FIG. 9), and when one of the selectable categories is selected, a request for the service definition information 25 of the ID corresponding to the selected category is transmitted to the directory server 20.

Figure 10B:
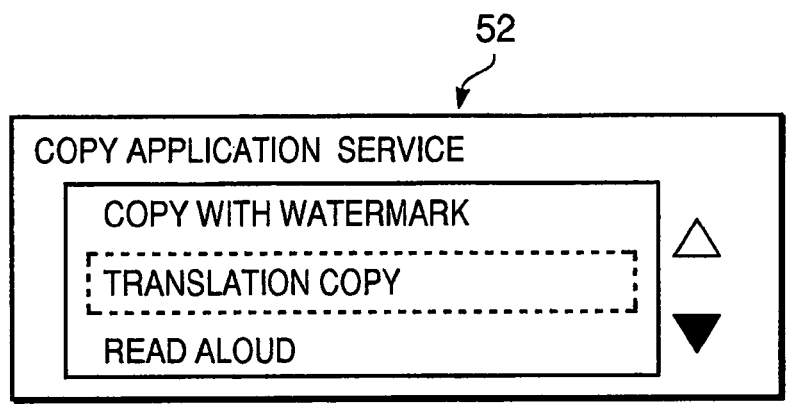
Figure 10C:
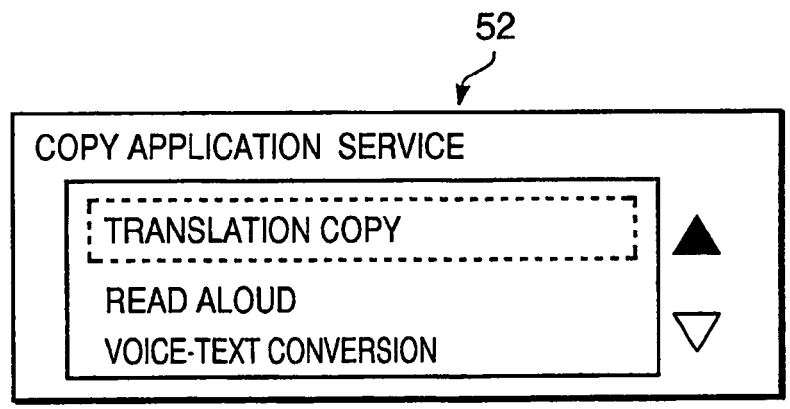

If step S116 is executed after an item of the service definition information 25 other than the top item thereof has been received, for example, if the service definition information 25 related to the "copy application service" is received, the service selection window as shown in FIG. 10B or 10C is displayed, in accordance with the service definition information 25 (XML description) shown in FIG. 11. That is, as shown in FIG. 10B or 10C, the character string "Copy Application Service" is displayed at an upper potion in the display area of the display 52, and the character strings corresponding to the selectable service items (Link_Title), i.e., "Copy with Watermark", "Translation Copy", "Read Original Aloud", "Voice/Text Conversion" are displayed at lower portions in the display area of the display 52.

In this illustrative embodiment, when all the items (selectable service items) cannot be displayed simultaneously due to a limitation of the display area, the window is configured so that the service items can be scrolled in both up-and-down directions. FIG. 10B and FIG. 10C show such a configuration, where FIG. 10C shows a state after the items shown in FIG. 10B are scrolled up by one line. To the service selection window shown in FIG. 10B or FIG. 10C, IDs of other service definition information 25 respectively corresponding to the selectable service items are assigned (see "Link_Location" of FIG. 11), and when one of the selectable service items is selected, a request for the service definition information 25 of the ID corresponding to the selected service item is transmitted to the directory server 20.

In S110, if designation by direct input of the request destination address is selected (S110: NO), the process displays an address input window (not shown) for allowing the user to directly input the address on the display 52 (S118), and the process proceeds to the next step (S120).

In this way, after the service selection screen or the address input screen has been displayed, the user can select any of the items (address input operation), depress each key, or terminate the service mode (termination operation) through the operation unit 12.

Next, the process receives the input operation by the user through the operation unit 12 (S120). In S122, the process judges whether the input operation is an operation for selecting a link. In S122, the process determines that a link has been selected when an operation of selecting an item displayed on the service selection window displayed in S116 or an operation to input an address using the address input window displayed in S118 has been performed.

When it is determined that the operation is not for selecting a link (S122: NO), if the input operation is to stop the process (S124: YES), the process returns to S104 and finishes the process in the service mode. If the input operation is not to stop the process (S124: NO), the process outputs an alarm (e.g., a buzzer sound) in S126, and returns to S120.

If it is determined that the input operation is to select a link (S122: YES), the process judges whether the selected link is a link to a service, that is, the ID to request the function server 30 to provide a service (S128).

If it is determined that the selected link is not a link to a service, that is, if the selected link is an ID for different service definition information 25 (S128: NO), the process requests the directory server 20 for reference to the list of the services. Then, after receiving the service definition information 25 (S130), the process returns to S116 and displays the service selection window on the display 52.

If it is determined that the selected link is a link to a service (S128: YES), the process executes a session process (see FIG. 12) in S132, returns to S104, and finishes the process in the service mode.

(2-2) Session Process

Next, the session process, which is called at S132 in FIG. 7, will be explained in detail with reference to FIG. 12 and FIG. 13.

In the session process, first, the service to be used is selected and the service start up instruction is transmitted, together with the user ID, based on the Link_Location of service definition information 25 (or the address, if it has been directly entered) (S202). That is, by transmitting a service start-up instruction to the service address by the HTTP request, the service selected by the user is booted on the function server 30. A session ID is returned as the HTTP response from the function server 30 which has received the service start-up instruction. The user ID here is the user ID stored in the storage unit 16 in the service information storing process (see FIG. 10), which is the user ID corresponding to the service to be started up.

Next, the process receives the session ID returned from the function server 30 in accordance with the service start-up instruction at S204. It should be noted that, unless explicitly stated, the HTTP requests and HTTP responses transmitted/received in subsequent processes are all transmitted/received with the session ID included therein. The function server 30, which is to receive the HTTP request, is configured to manage the currently communicating device in accordance with the session ID (known session management).

Next, an "MFP instruction inquiry" for inquiring about the existence of instructions for the MFP 10 is transmitted to the function server 30 as an HTTP request (S206). If an instruction for the MFP 10 has been generated, the function server 30 which received the "MFP instruction inquiry" returns an instruction indicating the generated instruction (otherwise, an instruction indicating "no instructions" if no instructions have been generated) as the HTTP response.

Next, after the instruction (i.e., the MFP instruction) returned in response to the inquiry in S206 has been received (S208), the process judges whether the received instruction is a job start-up instruction (S208). The "job start-up instruction" is generated by the function server 30 after transmitting the service start-up instruction in S202. The job start-up instruction includes instructions to start one of "UI job", "input job (scan job or voice job)", and "output job (print job or speaker job)", depending on the timing and service content. To this job start-up instruction, a job ID of the job to be activated, a type of job (UI job, input job (scan job or voice job), or output job (print job or speaker job)) and the communication destination address of the job have been added.

If it is determined in S210 that the received instruction is a job start-up instruction (S210: YES), the resources required to start up the job is secured (S212), and then the job that is instructed to start is performed in steps S252 to S266, described below.

Next, steps S252 through S266 will be described with reference to FIG. 13.

First, the process judges whether the job instructed by the job start-up instruction is a UI job (S252). If it is determined to be the UI job (S252: YES), the job is started according to the job ID and communication destination address attached to the job start-up instruction (S254). Then, the process proceeds to the next step (S214 of FIG. 12). The UI job is performed simultaneously with other process after being started-up in S254 and is described in detail in "UI Job process" with reference to FIG. 14.

If the process determines that the job designated by the job start-up instruction is not the UI job (S252: NO), but is the scan job (S256: YES) or the voice job (S256: NO, S262: YES), which belong to the input job, the process proceeds to the next step (S214 in FIG. 12) after the input job is started up in accordance with the job ID and communication destination address attached to the job start-up instruction (S260). The input job is performed in parallel with other processes after being started up in S260 and is described in further detail in "Input Job" with reference to FIG. 17.

If it has been determined that the job designated by the job start-up instruction is not any of the foregoing jobs (S258: NO), but a print job (S258: YES) or a speaker job (S262: NO, S264: YES), which belong to the output job, the process proceeds to the next step (S214 in FIG. 12) after the output job is started up in accordance with the job ID and communication destination address attached to the job start-up instruction (S266). This output job is performed in parallel with other processes after being started up in S266 and will be described in further detail in "Output Job" with reference to FIG. 18.

If it has been determined that the job instructed by the job start-up instruction is not any of the foregoing jobs (S264: NO), the process proceeds to the next step (S214 in FIG. 12) without starting up a job.

Figure 12:
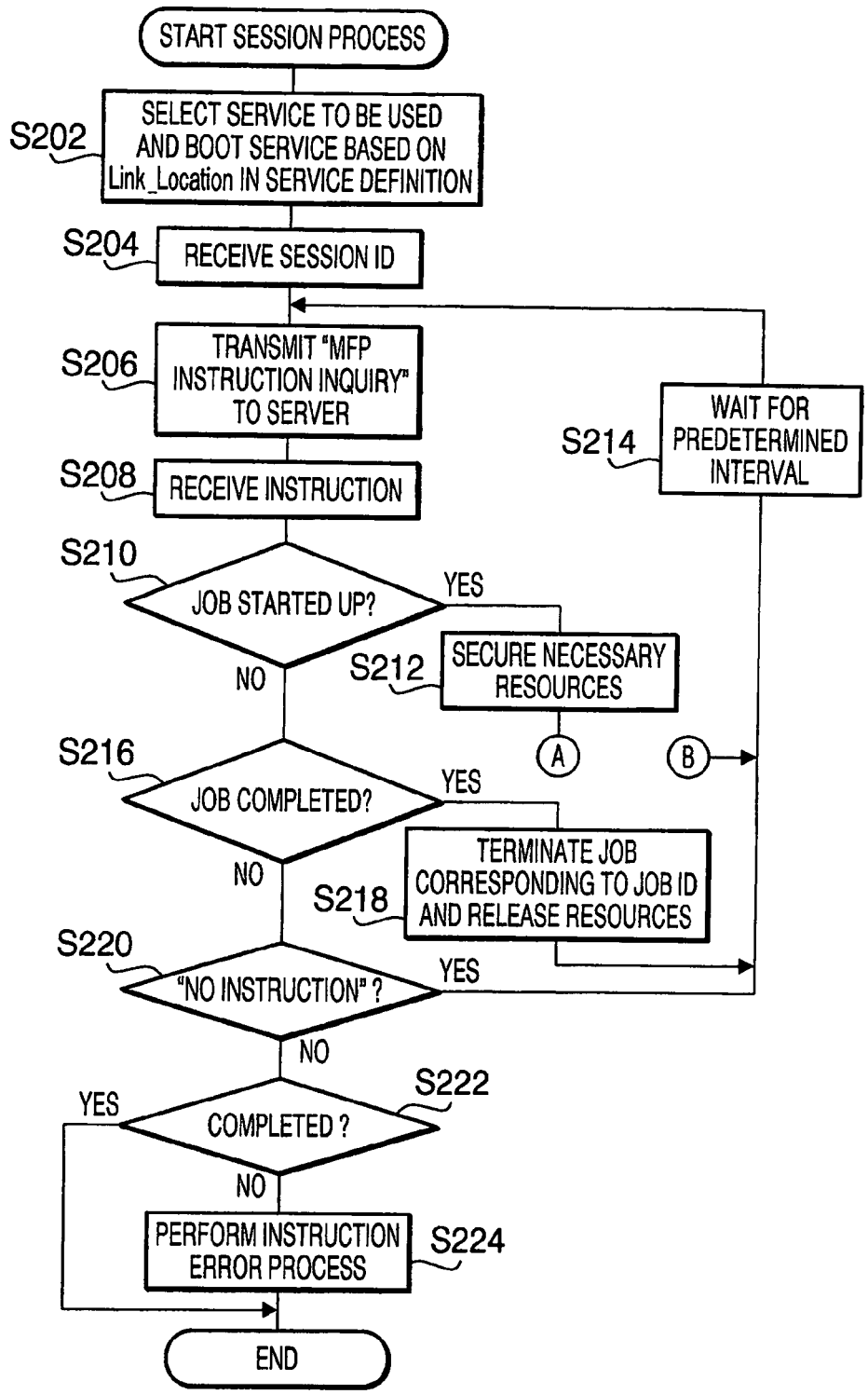
FIGS. 12 and 13 show a flowchart illustrating a session process according to aspects of the invention.

After the job is started up, the process returns to FIG. 12 and, after pausing for a predetermined interval (S214), returns to S206.

If the process determines that the instruction is not the job start-up instruction (S210: NO), the process judges whether the instruction received in S208 is a job completion instruction (S216). This "job completion instruction" is generated by the function server 30 when the job is finished after having been started up in respective steps in FIG. 13. In the job completion instruction, a job ID of the completed job is attached.

If the process determines that the instruction is a job completion instruction (S216: YES), the job having the job ID attached to this job completion instruction is terminated (a completion instruction is sent to the relevant job) and the process proceeds to S214 after the resources, which were secured in S212 before the job was started up, are released (S218).

If the process determines that the received instruction is not the job completion instruction (S216: NO), the process judges whether the instruction indicates "no instructions" (S220). If "no instructions" is indicated (S220: YES), the process proceeds to S214. If "no instruction" is not indicated, the process judges whether the instruction is a session completion instruction (S222). The "session completion instruction" is generated by the function server 30 when the provision of service to the MFP 10 has been completed.

If the process determines that the instruction is a session completion instruction (S222: YES), the present session process is completed. If the instruction received in S208 is not any of the foregoing instructions, the session process is completed after a process for indicating an error (i.e., an instruction error process) is performed (S224). In S224, an error message is displayed 52.

(2-3) UI Job

Figure 13:
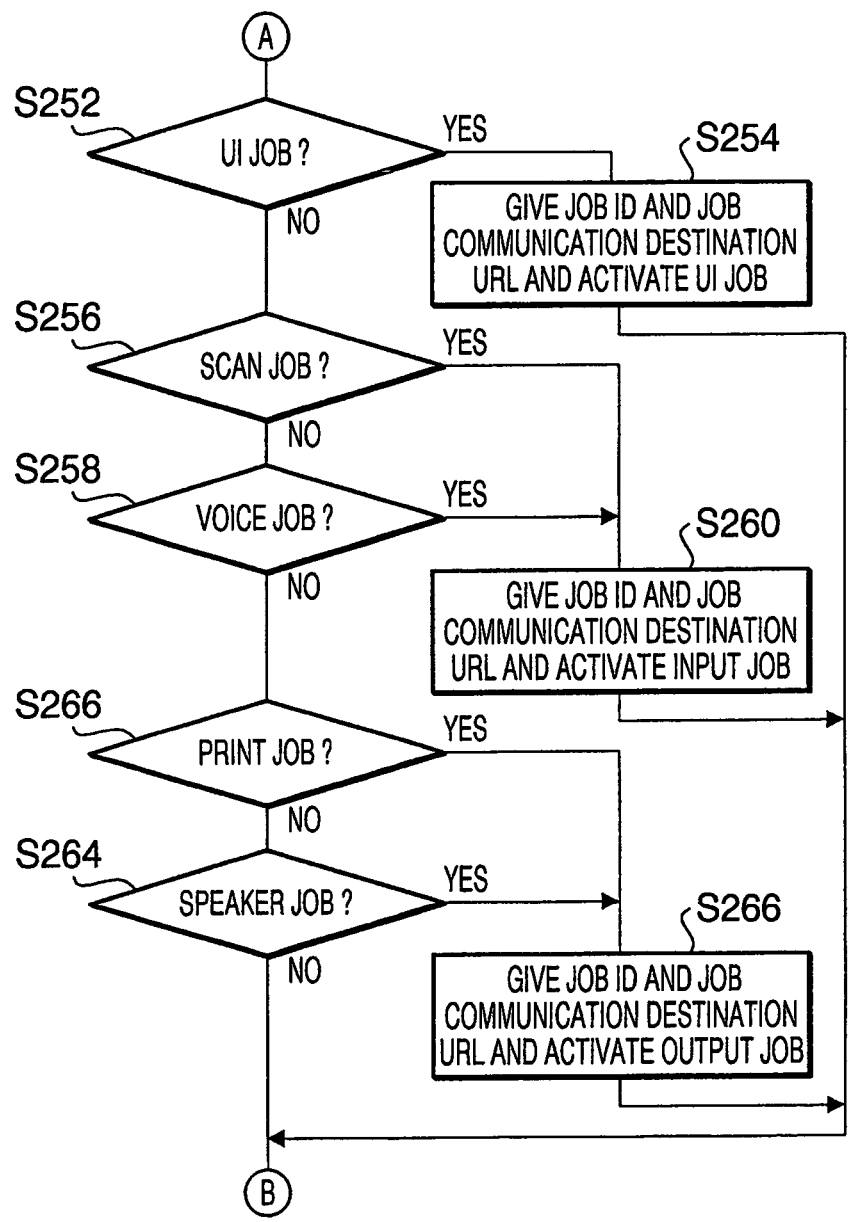
Figure 14:
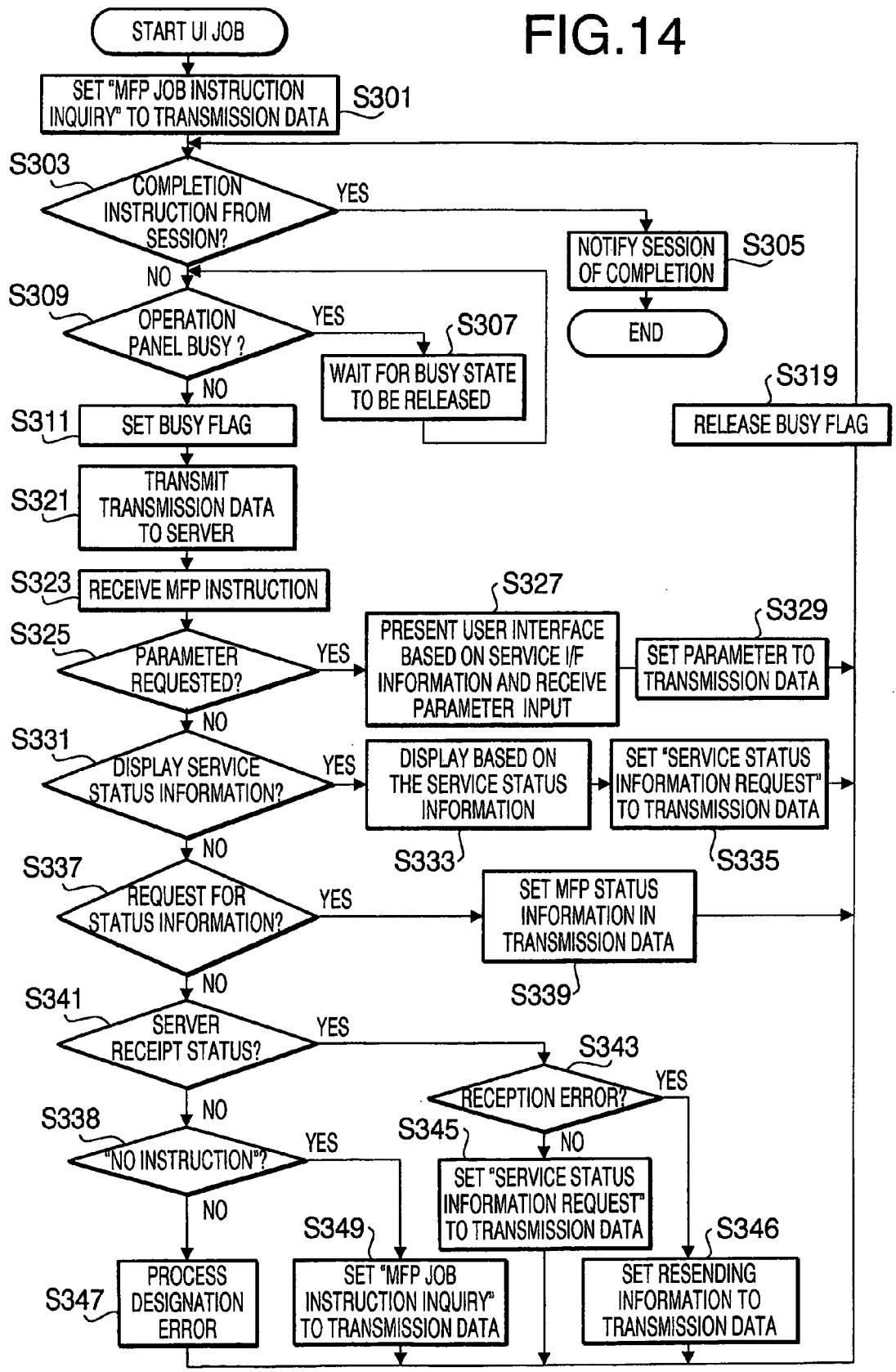
FIG. 14 is a flowchart illustrating a UI job process executed by the MFP according to aspects of the invention.

Next, the UI job started up in S254 in FIG. 13 is explained in detail with reference to FIG. 14.

When the UI job is started, a "service I/F information transmission request" for requesting the function server 30 to transmit the service I/F information 36, and an URL specifying the request destination of the request are stored in a predetermined area as transmission data. The transmission data will be used in S321 (described later), and the information stored as the transmission data will be transmitted to the function server 30 together with the session ID and job ID. It should be noted that the storage area of the transmission data is defined in a RAM (not shown) provided in the control unit 11 of the MFP 10 (S301).

Next, the process judges whether the completion instruction is received from the session process (S303). This completion instruction is given in S218 of FIG. 12.

If it is determined that there has been a completion instruction from the session processing (S302: YES), the present UI job is terminated after the completion of UI job is indicated to the session process (S305). The session completion instruction is received during the processing in S218 of FIG. 12. In step S218, when the instruction is received, it is determined that the job has been completely terminated, and subsequent processes will be performed.

If it is determined that the completion instruction has not been received from the session process (S303: NO), the process determines whether the operation unit 12 is in a busy status (S309). In this step, a busy flag Fu is referred to. The busy flag Fu is set ("1" is set) when each job has been started up. If the busy flag Fu is set (i.e., equal to "1"), the operation unit 12 is in the busy status, while, if the busy flag Fu is not set (i.e., equal to "0"), the operation unit 12 is not in the busy status.

If the operation unit 12 is busy (S309: YES), the process returns to S309 after waiting until the operation unit 12 is released from its busy state, i.e., until the busy flag Fu is released (S307). If the operation unit 12 is not busy (S309: NO), the busy flag Fu is set (S311) and the operation unit 12 becomes busy as the present UI job is being performed.

Next, the information stored in the transmission data storage area is transmitted to the function server 30 with session ID and job ID as an HTTP request (S321). The function server 30 that received the HTTP request returns the MFP instruction as the HTTP response if there is an instruction to the current UI job.

If the process receives the MFP instruction transmitted as the HTTP response (S323), the process judges whether the instruction is a parameter request (S325). The parameter request is a request transmitted in S904 of FIG. 23 (UI job process) executed in the function server 30. Based on the service I/F information 36 added to the parameter request, the user is requested to designate parameters necessary for using the service.

If the process determines that the received instruction is a parameter request (S325: YES), based on the service I/F information 36 added to the parameter request, a parameter input window is displayed on display 52 and the user is asked to perform parameter setting operation (S327).

The parameter input screen display is described using service I/F information 36 corresponding to the translation copy service as an example. When the translation copy service is executed, the function server 30 recognizes text information by applying an OCR (Optical Character Recognition) process to image data, which is read by the reading unit 13 of the MFP 10, then generates image data representing text translated into a predetermined language, which is printed by the recording unit 14 of the MFP 10.

Figure 16A:
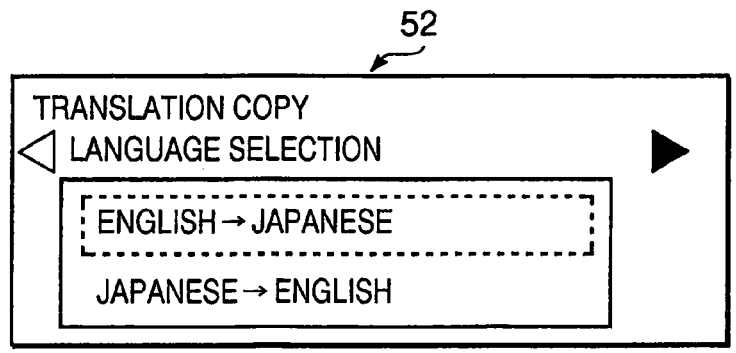
FIGS. 16A-16E show parameter input windows according to aspects of the invention.

First, based on an XML description shown in FIG. 15, a parameter input window as shown in FIG. 16A is displayed. In the parameter input window, as shown in FIG. 16A, the letters "translation copy" are indicated at the upper part of the display area as the display title (Title), the characters "language selection" are allocated below the display title as an input item (Disp_Name), and below the "language selection", the characters "English→Japanese" and "Japanese→English", which are items (Disp_Select) indicating the selectable parameters of the input item, "language selection", are indicated. Although there are further input items "scanner setting", "print setting", and "comments" related to "translation copy", in addition to the foregoing "language selection", only input items regarding "language selection" are shown at this time. This is merely due to limitations in the size of the display 52, and in this exemplary embodiment, the input items shown in the lower part of the display area can be switched between four types, including "scanner setting", "print setting", and "comments", by pressing the left and right direction keys 48 and 49 (switching operation, described hereafter) from this state as shown in FIGS. 16B-16E.

Figure 16B:
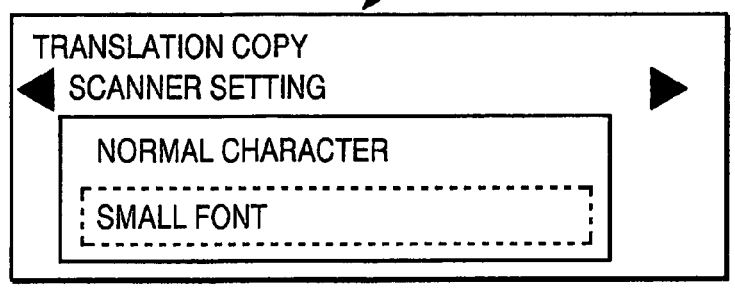

With regards to the selectable parameters of the input items, the characters "normal font" and "small font" are shown as the items (Disp_Select) indicating selectable parameters for "scanner setting" (see FIG. 16B). The "normal font", in this illustrative embodiment, means that the resolution (reading resolution), which is a parameter of reading unit 13, is 300×300 dpi, and the "small font" means the resolution is 600×600 dpi.

Figure 16C:
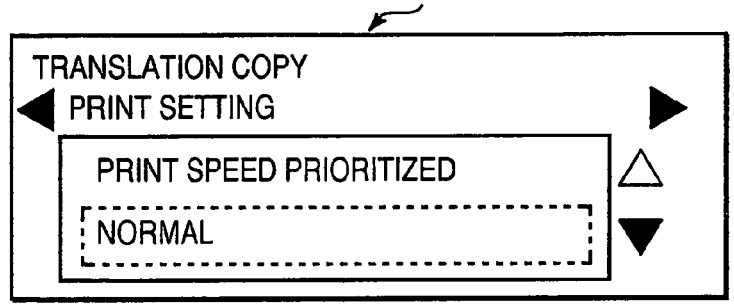
Figure 16D:
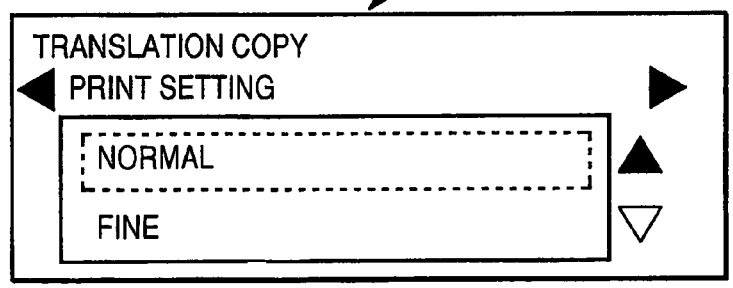

Characters "printing speed prioritize", "normal", and "fine" are shown as the items (Disp_Select) indicating selectable parameters for "print setting" (refer to FIG. 16C). Although "fine" is not initially shown due to limitations in the size of display 52 (refer to FIG. 18C), it can be shown by scrolling the window (refer to FIG. 16D). The "printing speed prioritized" means the resolution (printing resolution), a parameter of the recording unit 14, is set to 200×200 dpi, "normal" means the resolution is set to 300×300 dpi, and "fine", means the resolution is set to 600×600 dpi in this illustrative embodiment.

Figure 16E:
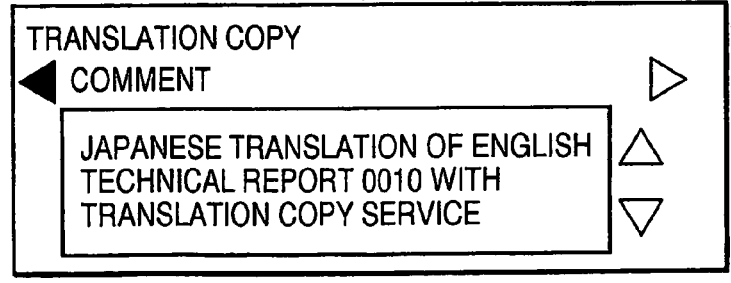

With regards to "comments", an entry field is shown below the characters "comment" and the set character string (Default String) is entered (refer to FIG. 16E). The character string entered in the entry field as a comment may be used as the header or footer of an image when printed.

When the parameters are designated for each input item, character strings are input in entry fields, and a confirming operation of the designated items are performed after the parameter input window is displayed. The process stores the input information (i.e., parameters) in a storage area as the transmission data (S329). Then, the process releases the busy flag Fu (i.e., set the flag Fu to "0") (S319), and returns to S303.

If the MFP instruction received in S323 is determined not to be the parameter request (S325: NO), the process judges whether the received MFP instruction is a display instruction of the service status information (S331). The service status information display instruction is an instruction issued by the function server 30 (S926 of FIG. 23), which is for indicating whether an operation regarding the service is performed without any problem. The service will be terminated due to some problem, or the like.

If the process determines that the instruction is a display instruction of the service status information (S331: YES), a display based on this service status information is displayed on the display 52 (S333), and a service status information request which requests information on the service operation status provided by the function server 30 is stored in the transmission data storage area as the transmission data (S335). Then, the process releases the busy flag Fu (S319), and returns to S303.

If the process determines that the instruction is not the service status information display instruction (S331: NO), the process judges whether the MFP instruction received in S323 is the status information request (S337). The status information request is an instruction requesting the information regarding the status of the MFP 10.

If the process determines that the instruction is the status information request (S337: YES), the process stores the information regarding the status of the MFP 10 (e.g., run-out of sheet, cover opened, etc.) in the storage area as the transmission data (S339). The, the process releases the busy flag Fu (S319), and returns to S303.

If the process determines that the instruction is not the status information request (S337: NO), the process judges whether the MFP instruction received in S323 is an instruction representing the server receipt status (S341). The server receipt status is the instruction for indicating whether the function server 30 was able to receive the information transmitted from the MFP 10.

If the instruction is a server reception status (S341: YES), control proceeds to S343. Then, if the content of this server reception status indicates abnormal reception (NG) (S343: YES), information that triggers the transmission of this server reception status is stored in the storage area as the transmission data (S346). Then, the process releases the busy flag Fu (S319), and returns to S303. If the content of the server reception status does not indicate the abnormal reception (S343: NO), the process stores the service status information request in the storage area as the transmission data (S345), releases the busy flag Fu (S319), and returns to S303.

If the instruction received in S323 is not the server reception status (S341: NO), the process judges whether the MFP instruction received in S323 represents "no instructions" (S338). If the instruction represents "no instructions" (S338: YES), the process proceeds to S349 where the process stores the MFP job instruction inquiry in the data storage area as the transmission data. Thereafter, the process releases the busy flag Fu (S319), and returns to S303. If the received instruction does not represent "no instructions" (S338: NO), an error processing is performed (S347), and the process releases the busy flag Fu (S319), and returns to S303. The error processing in S347 may include storing information indicating the occurrence of an error as the transmission data, displaying information indicating the occurrence of the error on the display 52, and the like.

(2-4) Input Job

Figure 17:
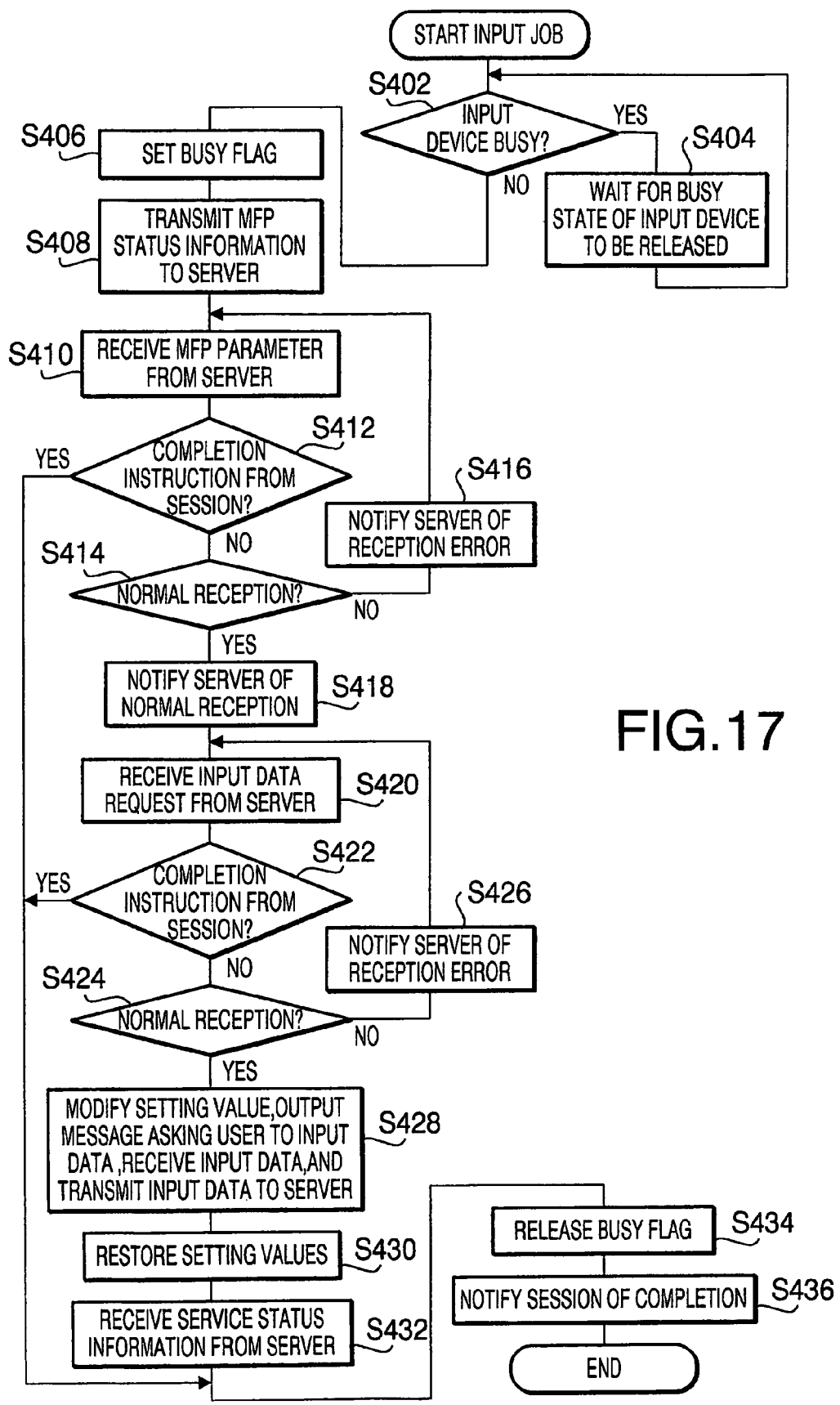
FIG. 17 is a flowchart illustrating an input job executed by the MFP according to aspects of the invention.

Next, the input job process activated in S260 of FIG. 13 will be described in detail with reference to FIG. 17. The input job shown in FIG. 17 is executed in parallel with the session process and the UI job described above.

When the input job is started, the process judges whether the input device is in the busy state (S402). In this illustrative embodiment, the input device is determined to be in the busy state if the busy flag Fi is set (i.e., set to "1"), while the input device is determined not to be in the busy state if the flag is released (i.e., set to "0"). It should be noted that, according to the illustrative embodiment, the "input device" may be the reading unit 13 when receiving the service related to the image data generated in the reading unit 13, and may be the sound input unit 17 when receiving the service related to the sound data generated in the sound input unit 17.

If the process determines that the input device is in the busy state (S402: YES), the process waits until the input device is released from its busy state (S404), then returns to S402. If the input device is not in the busy state, the process sets the busy flag Fi (S406).

Next, the process transmits the MFP status information, related to the MFP 10 status, by the HTTP request to function server 30, together with the job ID assigned to in S260 in the session process (S408). When the MFP status information is received, the function server 30 returns the MFP parameter, which is information generated based on the parameter transmitted to function server 30 in S321 of FIG. 14, as the HTTP response.

If the MFP parameter is returned (S410) in response to the MFP status information transmitted in S408, the process judges whether the completion instruction has been received from the session process (i.e., whether the completion instruction is issued by the session process) in S412. The completion instruction is given from the session process to the input job when the job to be completed in S218 of FIG. 12 is the input job.

When the completion instruction has not been given from the session process (S412: NO), if the MFP parameter returned in S410 has not been received successfully (S414: NO), the MFP reception status for indicating that the information from the function server 30 cannot be received normally (i.e., abnormal reception (NG)) is transmitted to the function server 30 by the HTTP request (S416), together with the job ID given in S260 in the session process. As the function server 30 which received the MFP reception status transmits the MFP parameter again as the HTTP response, the process returns to S410 after execution of S416.

If, in S410, the MFP parameter has been received successfully (S414: YES), the MFP reception status for indicating that the information from the function server 30 was received normally (i.e., normal reception (OK)) is transmitted to the function server 30 by the HTTP request (S418), together with the job ID assigned in S260 in the session process. The function server 30 which received the MFP reception status returns an input data request requesting for transmission of data to be processed by the function server 30, as will be described later.

Next, if the input data request is returned from the function server 30 which received the MFP reception status (S420), the process judges whether the completion instruction is given by the session process (S422).

When the session process has not given the completion instruction (S422: NO), if the input data request returned in S420 has not been received successfully (S424: NO), the MFP reception status for notifying of the abnormal reception (NG) is transmitted to the function server 30 (S426), as in S416. When the MFP reception status has been received, the function server 30 transmits the input data request again, as explained later, and thus, the process returns to S420 after execution of S426.

If the input data request returned in S420 has been received successfully (S424: YES), the input data to be processed by the function server 30 is transmitted by the HTTP request to the function server 30 (S428), together with the job ID assigned in S260 of the session process.

Specifically, the setting values of the input device is changed to the values indicated by the MFP parameter received in S410, and then a data input window asking the user to input data to be processed by the function server 30 on the display 52, thereby asking the user to perform input operation for inputting data in the MFP 10. Then, the data obtained from the user (i.e., input data) is transmitted to the function server 30 by the HTTP request, together with the job ID assigned in S260 in the session process. For example, messages such as "set original and press OK key", "pick up handset and speak" and the like are displayed on the display 52, and then, data acquired through the reading unit 13 and/or the sound input unit 17 is transmitted to the function server 30 subsequently. The function server 30 which received the input data may return the service status information for indicating whether the data processing according to the input data has been completed successfully.

The method for acquiring data in the process may be retrieval of data from a memory card set in a memory card slot (not shown) or readout of data from a certain storage area in the storage unit 16. In such a case, a message asking the user to specify the storage area from which the data is retrieved is to be displayed on the display 52.

After the input data is transmitted to the function server 30, the setting of the input device modified in S428 is returned to the original values (S430), and subsequently, the service status information returned from the function server 30 is received (S432).

When the service information is received in S432, or if, in S412 and S422, the session process gave the completion instruction (S412: YES; S422: YES), the busy flag Fi set in S406 is released (S434), and the completion of the input job is notified to the session process together with the job ID assigned in S260 in the session process (S436), and the input job is finished. The notification of completion of the input job is received during the step S218 of the session process shown in FIG. 12. That is, in S218, when the instruction is received, the process determines that the job has been completely terminated and following steps are executed.

(2-5) Output Job

Next, the output job process activated in S266 of FIG. 13 will be described with reference to FIG. 18. The output job operates in parallel with the session process and the UI job.

When the output job is started, the process judges whether the output device is in the busy state (S502). In this step, the output device is determined to be in the busy status if a busy flag Fo is set (i.e., set to "1") and is determined not to be in the busy state when the flag is released (i.e., set to "0"). According to the illustrative embodiment, the "output device" is the recording unit 14 when receiving the service related to image data that is to be printed by the recording unit 14, and is the sound output unit 18 when receiving the service related to sound data that is to be output from the sound output unit 18.

If the process determines that the output device is in the busy status (S502: YES), the process waits until the output device is released from its busy state (S504), and the returns to S502. If the process determines that the input device is not in the busy state (S502: NO), the busy flag Fo is set (S506).

Next, the MFP status information representing the MFP 10 status is transmitted by the HTTP request to the function server 30, together with the job ID assigned in S266 in the session process (S508). The function server 30, which received the MFP status information, returns the MFP parameter, which is information based on the parameter transmitted to the function server 30 in S321 of FIG. 14 as the HTTP response.

Next, when the MFP parameter is returned in response to the MFP status information transmitted in S508 (S510), the process judges whether the completion instruction has been given from the session process (i.e., whether there is a completion instruction from session) in S512. This completion instruction is given from the session process to the output job when the job to be completed in S218 of FIG. 12 is the output job.

When the process determines in S512 that the completion instruction has not been received from the session process (S512: NO), if the MFP parameter returned in S510 has not been received successfully (S514: NO), the MFP reception status for indicating that the information from function server 30 has not been received successfully (i.e., abnormal reception (NG)) is transmitted to the function server 30 by the HTTP request (S516), together with the job ID assigned to in S266 in the session process. The function server 30 which received the MFP reception status transmits the MFP parameter again, and thus, the process returns to S510 after execution of S516.

If the MFP parameter can be received successfully (S514: YES), the MFP reception status for notifying that the information from the function server 30 has been received successfully (normal reception (OK)) is transmitted to the function server 30 by the HTTP request (S518), together with the job ID assigned to in S266 in the session process. The function server 30 which has received the MFP reception status returns data (i.e., the output data) created by the process based on the input data transmitted in S428 of FIG. 17, as will be described later.

If the output data is returned from the function server 30 which has received the MFP reception status (S520), the process judges whether the session process has given the completion instruction (S522), as in S512.

When it is determined in S522 that the completion instruction has not been given by the session process (S522: NO), if the output data returned in S520 has not been received successfully (S524: NO), the MFP reception status for indicating the abnormal reception (NG) is transmitted to the function server 30 (S526), as in S516. The function server 30 which received the MFP reception status transmits the output data again, as will be described later, and thus, the process returns to S520 after execution of S526.

If the output data returned in S520 has been received successfully (S524: YES), the process outputs the output data through the output device (S528). Specifically, the setting values of the output device are modified to the values represented by the MFP parameter received in S510, and then, the output data is output through the output device (e.g., images are printed in accordance with the image data, sound waves are output in accordance with the sound data).

When the output data has been output by the output device, the setting of the output device modified by the processing in S528 is returned to the original values (S530), and the MFP status information, which is information related to the MFP 10 status, is sent to the function server 30 by the HTTP request (S532), together with the job ID assigned to in S260 in the session process. The function server 30 which received the MFP status information returns the service status information, as will be described later.

After the service status information returned from function server 30 has been received (S534), or when the completion instruction has been received from the session process (S512: YES; S522: YES), the busy flag Fo set in S406 is released (S536) and the completion of the input job is notified to session processing together with the job ID assigned in S260 of the session process (S538), the present input job is finished. The notification of the completion of the input job is received during the process executed in S218 of FIG. 12. In S218, when the instruction is received, it is determined that the job has been completely terminated and the following processes are executed.

(3) Processing by Function Server 30

Each processing performed by control unit 31 of the function server 30 will be described hereinafter.

(3-1) Function Server Process

Figure 19:
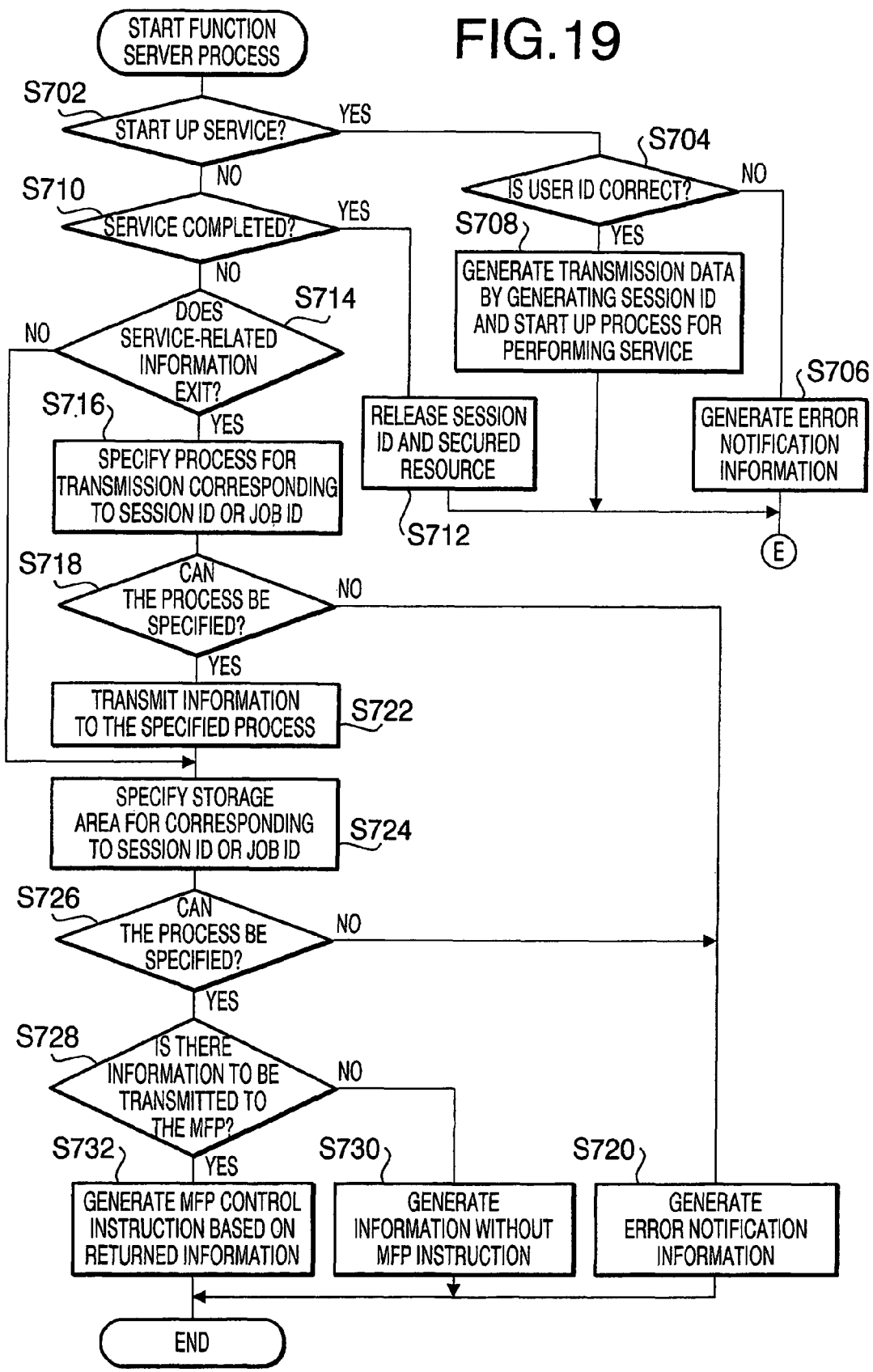
FIGS. 19 and 20 show a flowchart illustrating a function server process executed by the function server according to aspects of the invention.
Figure 20:
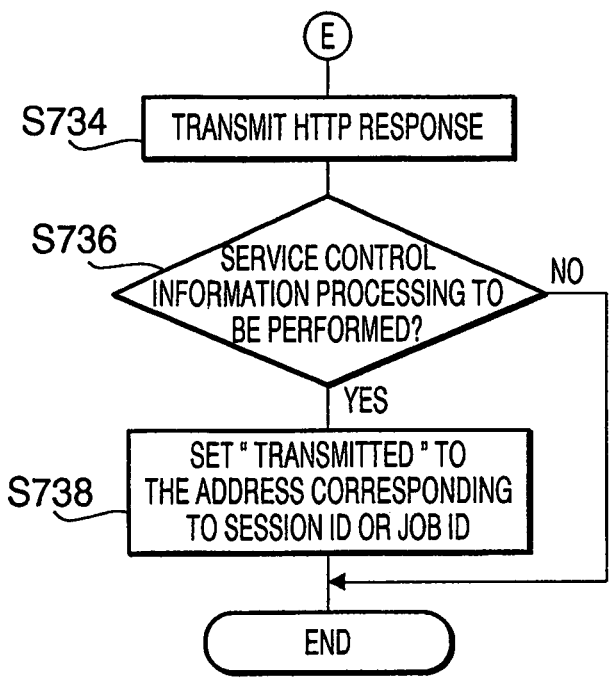

First, the procedures of the function server process performed every time when the HTTP request is received is explained, referring to FIGS. 19 and 20.

When the function server process is started, the process judges whether the received HTTP request is a service start-up instruction (S702). The "service start-up instruction" is transmitted by the MFP 10 in S202 of FIG. 12. If it is determined that the received HTTP request is the service start-up instruction (S702: YES), the process judges whether the user ID transmitted from the MFP 10 is a user ID that can use the present service (S704). If the received user ID is not the user ID that can use the service (S704: NO), the process generates information indicating an error (i.e., error notification information) in S706, and proceeds to S734. If the received user ID is the user ID that can use the service (S704: YES), the process generates the session ID and then transmission data representing the session ID, secures the resources for performing the service and starts a corresponding process (i.e., a session process: see FIG. 21) (S708). Then, the process proceeds to S734.

If it is determined that the request is not the service start-up instruction (S702: NO), the process judges whether the HTTP request is a service completion instruction (S710).

If it is determined that the request is the service completion instruction (S710: YES), the process releases the session ID and the resources secured in S708, creates transmission data representing the completion of the service (S712), and proceeds to execute the next procedure (S734). If it is determined that the request is not the service completion instruction (S710: NO), the process judges whether service-related information, i.e., information related to a service (session or job) is included, or more specifically, whether an HTTP request is transmitted by MFP 10 during execution of the session process or a job (UI job, input job, or output job) (S714).

If it is determined that the service-related information is included in the request (S714: YES), the process which has transmitted the HTTP request (session processing, UI job, input job, or output job) is identified (S716).

If the process cannot be identified (S718: NO), the control generates information indicating an error (i.e., error notification information), and then proceeds to S734.

If the process is identified (S718: YES), the control transfers the information transmitted by the HTTP request to the identified process (S722).

After S722 has been completed, if it is determined that the service-related information is not included (S714: NO), the storage area for information corresponding to the session ID or job ID is specified (S724).

If the storage area cannot be specified (S726: NO), the process proceeds to S720, generates the error notification information, and proceeds to S734. If the storage area has been specified (S726: YES), the process judges whether information to be returned to the MFP 10 exists in the storage area (S728).

Then, if there is no information to be returned to the MFP 10 (S728: NO), the process generates information representing "no MFP instruction" (S730) and proceeds to S734. If it is determined that information to be returned to the MFP 10 exists (S728: YES), the process generates an MFP control instruction based on the information to be returned (S732), and then the process proceeds to S734.

The process returns the information generated in S706, S708, S712, S720, S730 and S732 to the MFP 10 as the HTTP responses (S734). Among the HTTP responses returned to the MFP 10: the transmission data generated in S708 is received by the MFP 10 in S204 of FIG. 12; the transmission data indication service completion, which is generated in S712, is received by MFP 10 in S208 of FIG. 12, which is judged in S222 and is determined "YES". Furthermore, the error notification information generated in S720 is received by the MFP 10 in S208 of FIG. 12, which information is judged and determined "NO" in S222, and then step S224 is executed. The information representing "no instruction" generated in S730 is received by the MFP 10 in S208 of FIG. 12, which information is judged and determined "YES" in S220. The MFP control instruction generated in S732 has a different content in each job, and is received by the MFP 10 executing a corresponding job.

If the service control information process (S714-S732) is performed (S736: YES), the process sets the memory address corresponding to the session ID or job ID to "transmission completed" (S738), and finishes the function server process. If the service control information process has not been executed (S736: NO), the process does not set the memory address, and finishes the function server process.

(3-2) Session Process

Figure 21:
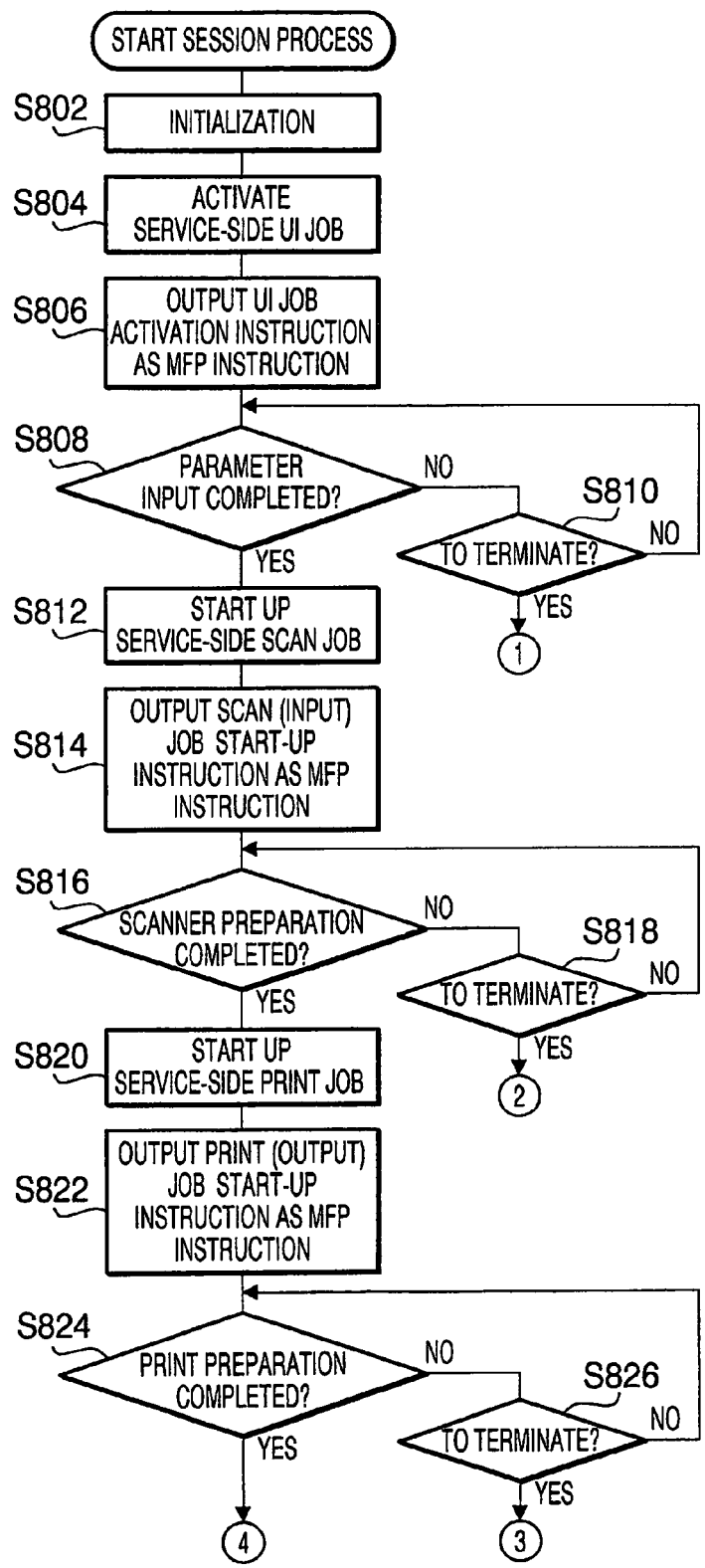
FIGS. 21 and 22 show a flowchart illustrating a session process executed by the function server according to aspects of the invention.
Figure 22:
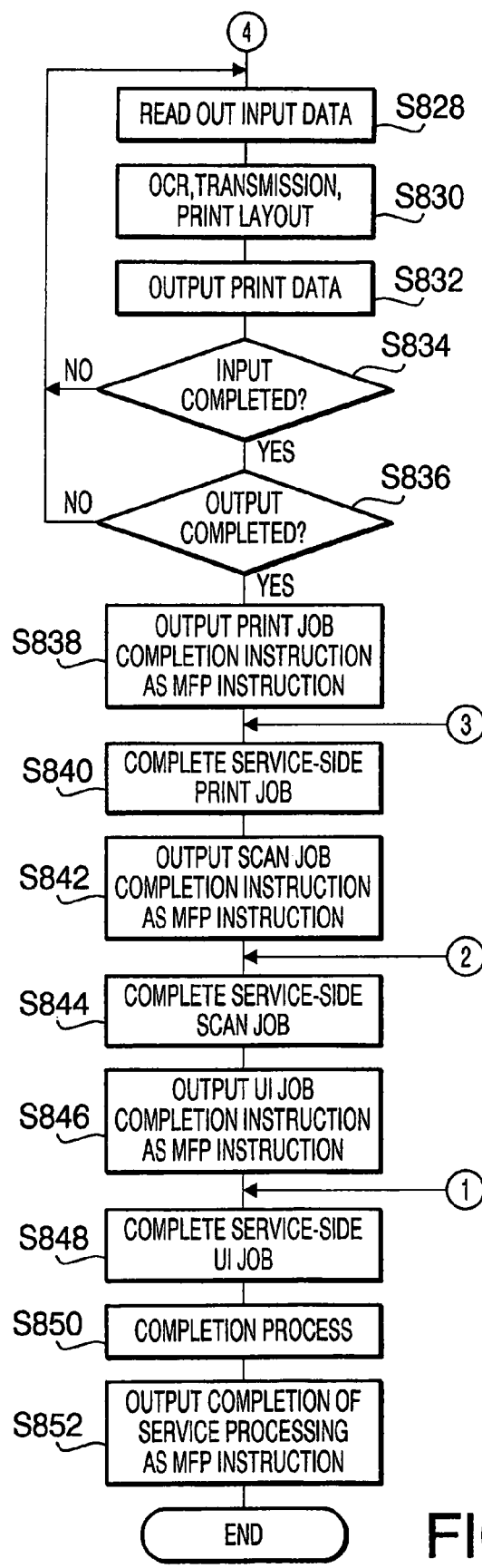

Next, the session process which is performed in parallel with the function server processing will be described referring to FIGS. 21 and 22. In the illustrative embodiment, the session processing regarding the translation copy service will be described as an example.

When the session processing is started, the process first executes initialization (S802). Then, the process starts up the service-side UI job (S804). The service-side UI job is a process performed in parallel with the session process and will be described in detail later.

Next, the process outputs the UI job start-up instruction as the MFP instruction (S806). Specifically, the process stores the UI job start-up instruction, together with the job ID and communication destination address, in the storage area for storing the return information. Then, based on the stored data, the MFP control instruction is generated in S732 of FIG. 19, which is transmitted as a start-up instruction to the MFP 10 in S734 of FIG. 20. The start-up instruction is received by the MFP 10 in S208 of FIG. 12, and based on the start-up instruction, the UI job is started up on the MFP 10 (S254 of FIG. 13).

Next, the process judges whether the parameter has been input from the MFP 10 (S808). As described later, in the UI job started up in S804, the parameter is obtained from the MFP 10, and a notification that the parameter is obtained is transmitted to the session process. Therefore, in S808, if the notification that the parameter is obtained is transmitted from the UI job, the process determines that parameter input from the MFP 10 has been completed.

If it is determined that parameter input is not completed (S808: NO), the process judges whether the UI job is terminated (S810). If acquisition of the parameter from the MFP 10 is not executed successfully the UI job is terminated and information representing the termination of the UI job is transmitted to the session process. Therefore, in S810, if such information is received (i.e., the termination of the UI job is notified), the process determines that the UI job is terminated.

If it is determined that the UI job is not terminated (S810: NO), the process returns to S808. If it is determined that the UI job is terminated (S810: YES), the process proceeds to S848.

If it is determined that the parameter input has been completed (S808: YES), a scan job, which is a type of service-end input job, is started up (S812). This scan job is a process performed in parallel with the session process, which will be described later.

Next, the process outputs the scan (input) job start-up instruction as the MFP instruction (S814). In this step, the process stores the scan job start-up instruction, together with the job ID and communication destination address in the storage area for storing the return information. Then, based on the stored data, the MFP control instruction is generated in S732 of FIG. 19, and is transmitted as an activation instruction to the MFP 10 in S734 of FIG. 20. This start-up instruction is received by the MFP 10 in S208 of FIG. 12, and based on the received instruction, the input job is started up in the MFP 10.

Next, the process judges whether preparation of the scanner (reading unit 13) on the MFP 10 has been completed (S816). In the scan job started up in S812, notification of the completion of scanner preparation on the MFP 10 is received and notification of this is transmitted to the present session process. Therefore, in S816, if notification of the completion of scanner preparation is received from the scan job, it is determined that scanner preparation on the MFP 10 has been completed.

If it is determined in S816 that scanner preparation is not completed on the MFP 10 (S816: NO), the process judges whether the scan job is terminated (S818). In the scan job started up in S812, if notification that scanner preparation has been completed has not been received from the MFP 10 successfully, the scan job itself is terminated (completed), and the termination of the scan job is notified to the session process. Therefore, if notification of termination is received from the scan job, the process determines that the scan job has been terminated.

If it is determined that the scan job is not terminated (S818: NO), the process returns to S816. If it is determined that the scan job has been terminated (S818:YES), the process proceeds to S844.

If it is determined that the scanner preparation is completed (S816: YES), the print job, which is one type of service-side output job, is started up (S820). This print job is performed in parallel with the session process, which will be described in detail later.

Next, the print (output) job start-up instruction is output as the MFP instruction (S822). In this step, the process stores the print job start-up instruction, together with the job ID and communication destination address, in the storage area which stores return information. Based on this, the MFP control instruction is generated in S732 of FIG. 19, which is transmitted as the start-up instruction to the MFP 10 in S734 of FIG. 20. This start-up instruction is received by the MFP 10 in S208 of FIG. 12, and based on this instruction, the output job is started-up on the MFP 10 (S266 of FIG. 13).

Next, the process judges whether preparation of the printer (recording unit 14) on the MFP 10 has been completed (S824). In the print job started up in S820, a notification of completion of print preparation on the MFP 10 is received, notification of which is transmitted to the session process. Therefore, if notification of the completion of print preparation has been received from this scan job, it is determined that print preparation on the MFP 10 has been completed.

If it is determined that print preparation has not been completed on the MFP 10 (S824:NO), the process judges whether the print job is terminated (S826). In the print job started up in S820, if notification that print preparation has been completed on the MFP 10 has not been received successfully, the print job itself is terminated (completed), notification of which is transmitted to the session process. Therefore, if notification of termination has not been received from the print job, it is determined that the print job is terminated.

If it is determined that the print job has not been terminated (S826: NO), the process returns to S824. If it is determined that the scan job has been terminated (S826: YES), the process proceeds to S840.

If it is determined that print preparation has been completed (S824: YES), the input data acquired from the MFP 10 is retrieved (S828). In the scan job started up in S812, the image data read by the reading unit 13 of the MFP 10 is acquired from the MFP 10. Therefore, in S828, among data (input data) acquired and stored in the predetermined storage area, data corresponding to one page is retrieved.

Next in S830, processed image data is generated by applying OCR processing, translation processing, and print layout processing to the input data read in S828. Specifically, a text part in the image represented by the input data is recognized by applying the OCR processing on the input data retrieved in S828. Then, the text part is translated into text in a designated language by applying the translation processing to this text part. This translation processing is performed according to the parameter obtained in the UI job started up in S804, and the text part is translated into the language represented by this parameter. Then, based on the recognized and translated text part, image data for printing is generated in accordance with the designated print layout.

Next, the image data generated in S830 is output (S832). In this step, the image data generated in S830 together with the job ID and communication destination address are stored in the storage area for storing the return information. Based on the data stored in the storage for storing the return information, the MFP control instruction is generated in S732 of FIG. 19, which is transmitted to the MFP 10 as the output data in S734 of FIG. 20. The output data is received by the MFP 10 in S520 of FIG. 18 and based on the data, the image is output by the recording unit 14.

Subsequently, the process judges whether readout of all the input data in S828 (data area for all pages) has been completed (S824). If the readout has not been completed (S834: NO), the process returns to S828, while, if all the input data has been read out (S834: YES), the process judges whether output of the output data in S832 (storing in the storage area) has been completed (S836).

If output of the output data has not been completed (S836: NO), the process returns to S828, while, if the output has been completed (S836: YES), the print (output) job completion instruction is output as the MFP instruction (S838). In this step, processing for storing the print job completion instruction, together with the job ID, in the storage area for storing the return information is performed. Based on the stored data, the MFP control instruction is generated in S732 of FIG. 19 and is transmitted to the MFP 10 as the completion instruction in S734 of FIG. 20. This completion instruction is received by the MFP 10 in S208 of FIG. 12, and based on the instruction, the output job of the MFP 10 is terminated (completed) (S218 of FIG. 12).

After print job completion instruction has been output or it is determined that the print job has been terminated (S826: YES), the service-side print job started up in S820 is finished (S840).

Next, the scan (input) job completion instruction is output as the MFP instruction (S842). In this step, the process stores the scan job completion instruction, together with the job ID, in the storage area for storing the return information. Based on the stored data, the MFP control instruction is generated in S732, which is transmitted to the MFP 10 as the completion instruction in S734. This completion instruction is received by the MFP 10 in S208 of FIG. 14, and based on the instruction, the input job is terminated (completed) on the MFP 10 (S218 of FIG. 14).

When the scan job completion instruction is output, or it is determined that the scan job has been terminated (S818: YES), the service-side scan job started up in S812 is finished (S844).

Next, the UI job completion instruction is output as the MFP instruction (S 846). In this step, the process stores the scan job completion instruction, together with the job ID, in the storage area for storing the return information. Based on the stored data, the MFP control instruction is generated in S732 of FIG. 19, which is transmitted to the MFP 10 as the completion instruction in S734 of FIG. 20. This completion instruction is received by the MFP 10 in S208 of FIG. 12, and based on the instruction, the UI job is terminated (completed) on the MFP 10 (S218 of FIG. 12).

In S850, a completion process such as releasing of resources secured in each job has been performed, and then the session process is terminated. In S852, the process stores the service completion instruction in the storage area for storing the return information. Based on the instruction, the MFP control instruction is generated in S732 of FIG. 19, which is transmitted to the MFP 10 as the completion instruction in S734 of FIG. 20. This completion instruction is received by the MFP 10 in S208 of FIG. 12, and based on the instruction, the session process on the MFP 10 is finished (S222 of FIG. 12).

(3-3) UI Job

Figure 23:
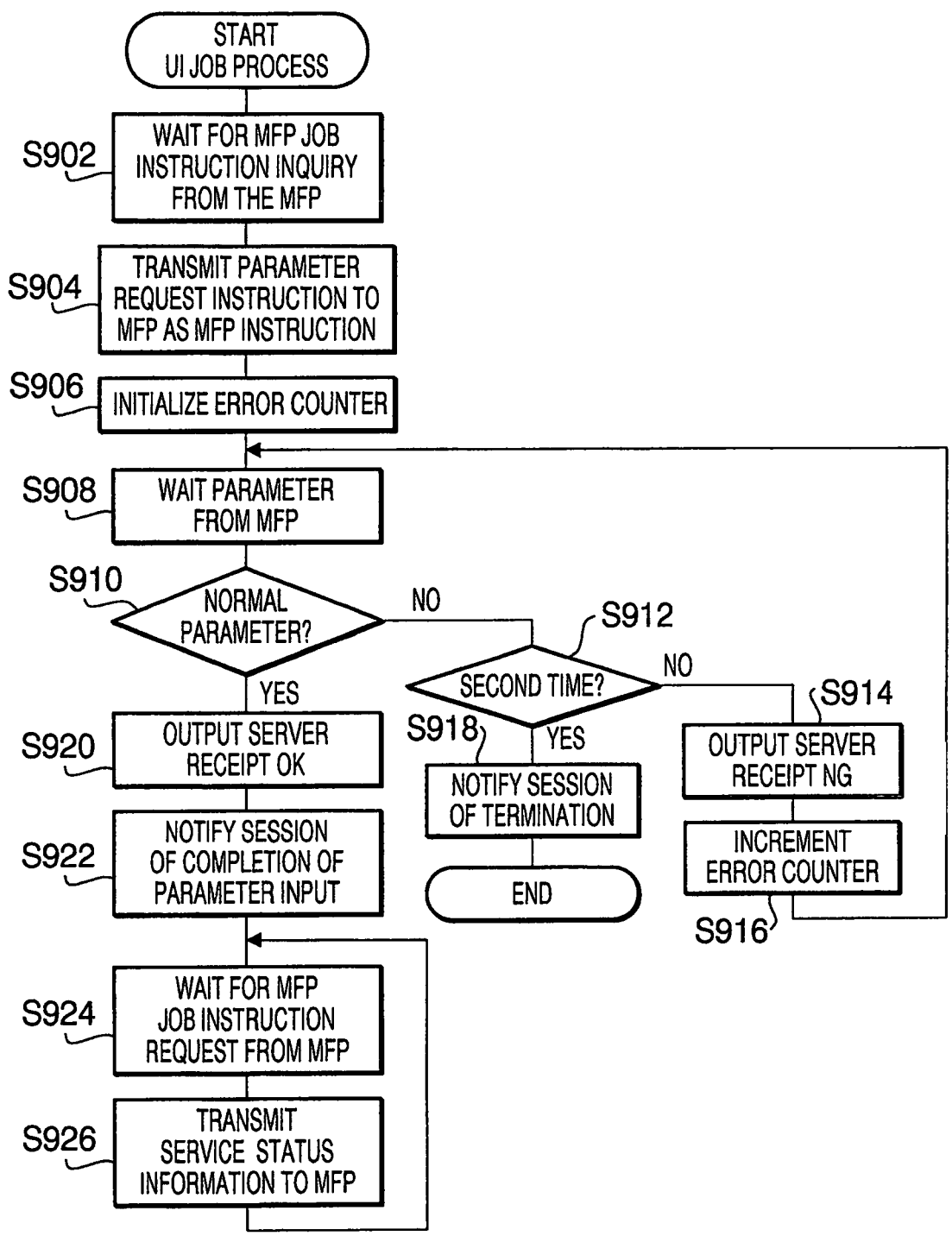
FIG. 23 shows a flowchart illustrating a UI job process executed by the function server according to aspects of the invention.

Next, UI job processing which is started up in S804 of FIG. 21 will be described referring to FIG. 23.

When the UI job is started, the process waits until the MFP job instruction inquiry is received as the HTTP request from the MFP 10. When received the MFP job instruction inquiry (S902), the process returns a parameter request instruction that requests for parameter settings necessary for performing the service to the MFP 10 as the MFP instruction (S904). The MFP job instruction inquiry received in S902 is the HTTP request transmitted by the MFP 10 in S321 of FIG. 14. The MFP instruction transmitted in S904 is the HTTP response received by the MFP 10 in S323 of FIG. 14. Specifically, to the HTTP response, the service I/F information 36 (e.g., information corresponding to the translation copy service) has been added. When received the MFP instruction, the MFP 10 transmits the parameter in S321 of FIG. 14.

Next, an error counter is initialized (S906). That is, a counter for counting the consecutive number of occurrences when the parameters cannot be received successfully is reset (i.e., set to "0").

Next, the process waits until the parameters are received from the MFP 10 that received the MFP instruction transmitted in S904. When the parameters are received (S908), the process judges whether the parameters have been received successfully (S910).

If it is determined that the parameter has not been received successfully (S910: NO), the process judges whether such a situation has occurred consecutively by a predetermined number of times (twice in this illustrative embodiment) based on the value of the error counter (S912). If it has not occurred consecutively by the predetermined number of times (S912: NO), the process outputs the server receipt status indicating that the parameter has not been received successfully (server reception NG; abnormal reception) in S914, and counts up the error counter (S926). Then, the process returns to S908.

In S914, the process stores the server receipt status in the storage area for storing the return information. Based on the server receipt status, the MFP control instruction is generated in S732 of FIG. 19 and transmitted as the server receipt status to the MFP 10 in S734 of FIG. 20. This server receipt status is received by the MFP 10 in S323 of FIG. 24, and based on the received information, the MFP 10 re-transmits the parameters (S341, S343, etc. in FIG. 14).

If a condition where the parameter cannot be received successfully occurs consecutively by a predetermined number of times (S910: YES), the process notifies the session process of termination (completion) of the UI job (S918), and terminates the UI job. The notification in S918 is received by the session process in S810 of FIG. 21.

If it is determined that the parameter has been received successfully (S910: YES), the process outputs the server receipt status indicating that the parameter has been received successfully (server reception OK; Normal reception) (S920). In this step, the process stores the server receipt status in the storage area for storing the return information. Based on the stored information, the MFP control instruction is generated in S732 of FIG. 19, which is transmitted to the MFP 10 as the server receipt status in S734 of FIG. 20. This server receipt status is received by the MFP 10 in S323 of FIG. 14. Based on the thus received server receipt status, it is verified in the MFP 10 that the parameter need not be retransmitted (S341, S343, etc. in FIG. 14).

Next, the process notifies the session process of the completion of parameter input (parameter acquisition) (S922). This notification is received by the session process in S808 of FIG. 21.

When S922 is completed, the process waits until the MFP job instruction inquiry is received from the MFP 10. When the MFP job instruction inquiry is received (S924), the process output the service status information (S926) repeatedly until the UI job is terminated (completed) by another process (e.g., S844 of FIG. 22). In S926, the process stores the service status information in the storage for storing the return information. Based on the stored information, the MFP control instruction is generated in S732 of FIG. 19, which is transmitted to the MFP 10 in S734 of FIG. 20 as the service status information.

(3-4) Scan Job

Next, a scan job process which is started in S812 of FIG. 21 will be described referring to FIG. 24.

When the scan job is started, the process waits until the MFP status information is received from the MFP 10. When the MFP status information is received (S1002), the error counter is initialized (S1004) as in S906 of FIG. 23, and the MFP parameter is output (S1006). The MFP status information received in S1002 is the HTTP request transmitted from the MFP 10 in S408 of FIG. 17. In response to the MFP status information, the process returns the MFP parameters as the HTTP response in S1006. The MFP parameter has been received in S908 of FIG. 23, and is a parameter corresponding to the MFP 10, which is the transmission source of the MFP status information received in S1002.

From the MFP 10 that received the MFP parameter, the MFP reception status indicating whether the MFP parameter was received successfully is transmitted from the MFP 10. Therefore, based on the MFP reception status, the process judges whether MFP parameter has been received successfully (S1008). Specifically, if the MFP reception status indicates the abnormal reception (NG), the process determines that the reception was failed, and if the normal reception (OK) is indicated, the process determines that reception has been performed successfully.

If it is determined that the MFP parameter has not been received successfully by the MFP 10 (S1008: NO), the process judges whether such a situation has occurred consecutively by a predetermined number of occurrence (twice in this illustrative embodiment) is checked, referring to the value of the error counter (S1010). If such a situation has not occurred consecutively by the predetermined number of times (S1010: NO), the process increments the error counter (S1012) and returns to S1006.

If the state where the parameter has not been received successfully occurs consecutively by the predetermined number of times (S1010: YES), the process notifies the session process of the termination (completion) of the scan job (S1014), and outputs the notification instruction indicating the abnormal completion as the service status information (S1016). This notification in S1014 is received by the session processing in S818 of FIG. 21. In S1016, the process stores the notification instruction in the storage area for storing the return information. Based on the thus stored information, the MFP control instruction is generated in S732 of FIG. 19, which is transmitted to the MFP 10 as the notification instruction in S734 of FIG. 20. The notification instruction is received by the MFP 10 in S410 of FIG. 17.

If it is determined that the MFP parameter has been received successfully by the MFP 10 (S1008: YES), it is determined that scanner (reading unit 13) preparation has been completed in the MFP 10, and the process notifies the session process of the completion of the scanner preparation (S1018). The notification is received by the session process in S816 of FIG. 21.

Next, the process outputs an input data request requesting for the transmission of data to be processed by the function server 30. That is, the process stores the input data request in the storage area for storing the return information (S1020). Based on the stored data, the MFP control instruction is generated in S732 of FIG. 19, which is transmitted to the MFP 10 as the input data request in S734 of FIG. 20. The input data request is received by the MFP 10 in S420 of FIG. 17, and then the user operates the MFP 10 and the input data is transmitted from the MFP 10.

When the input data is received from the MFP 10, which received the input data request (S1022), if reception of the input data is completed normally (S1024: YES), a notification instruction for indicating normal completion is output as the service status information (S1026), and then the scan job is completed. In S1026, the process stores the notification instruction in the storage area for storing the return information. Based on the stored information, the MFP control instruction is generated in S732 of FIG. 19, which is transmitted as the notification instruction to the MFP 10 in S734 of FIG. 20. The notification instruction is received by the MFP 10 in S432 of FIG. 17.

If reception of the input data has not been completed normally (S1024: NO), the process proceeds to S1016, outputs the notification instruction indicating the abnormal completion as the service status information, and completes the scan job. The notification instruction is received by the MFP 10 in S423 of FIG. 17.

(3-5) Print Job

Figure 25:
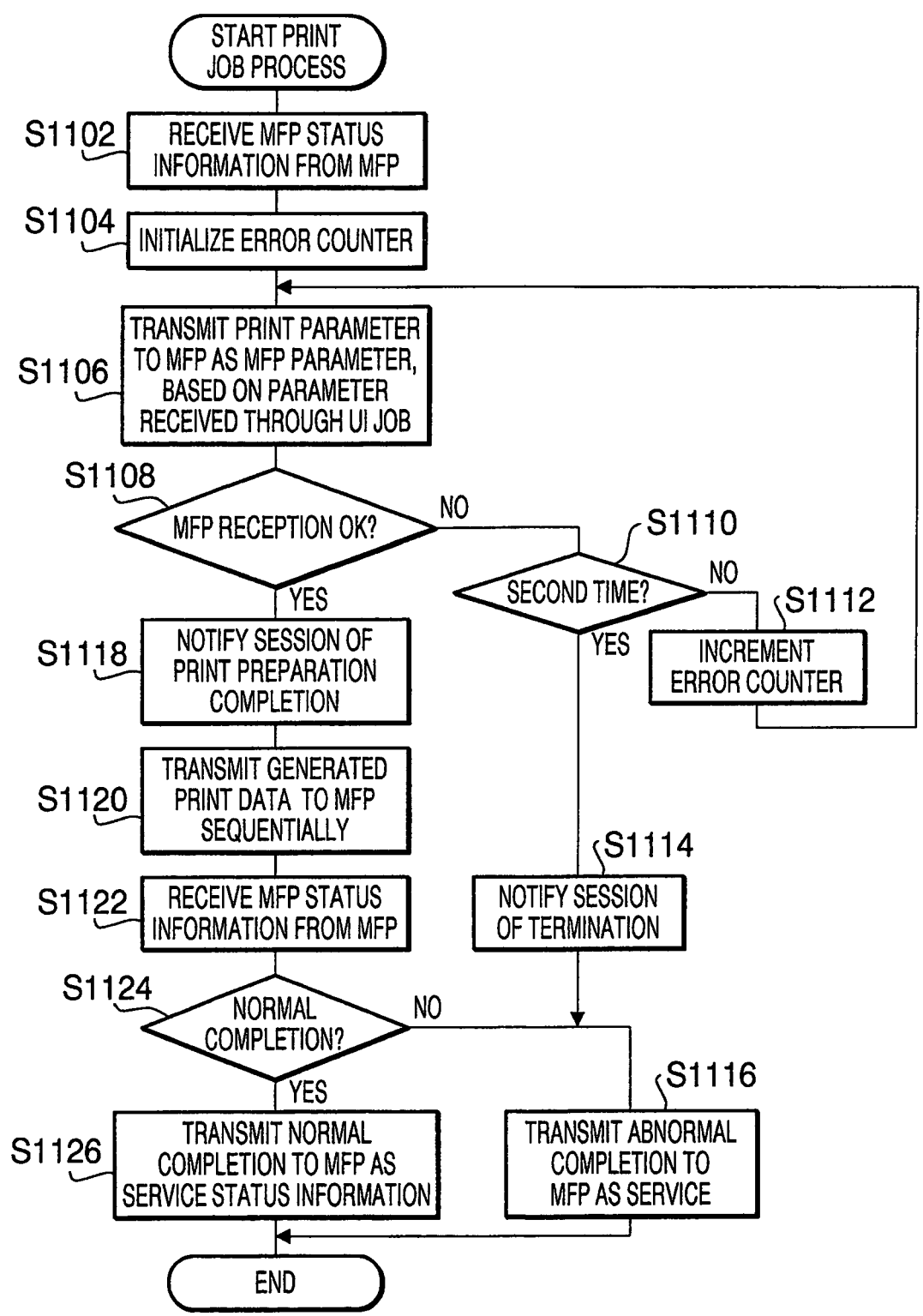
FIG. 25 shows a flowchart illustrating a print job process executed by the function server according to aspects of the invention.

Next, the print job processing which is started in S820 of FIG. 21 will be described referring to FIG. 25.

When print job is started, the process waits until the MFP status information is received from the MFP 10. When the MFP status information is received (S1102), the error counter is initialized (S104) as in S906 of FIG. 23, and then, the MFP parameter is output (S1106). The MFP status information received in S1102 is the HTTP request transmitted from the MFP 10 in S508 of FIG. 18, and the MFP parameter is returned in response to the HTTP request, as the HTTP response, in S1106. The MFP parameter is received in S908 of FIG. 23, and is a parameter corresponding to the MFP 10 which is the transmission source of the MFP status information received in S102.

Figure 24:
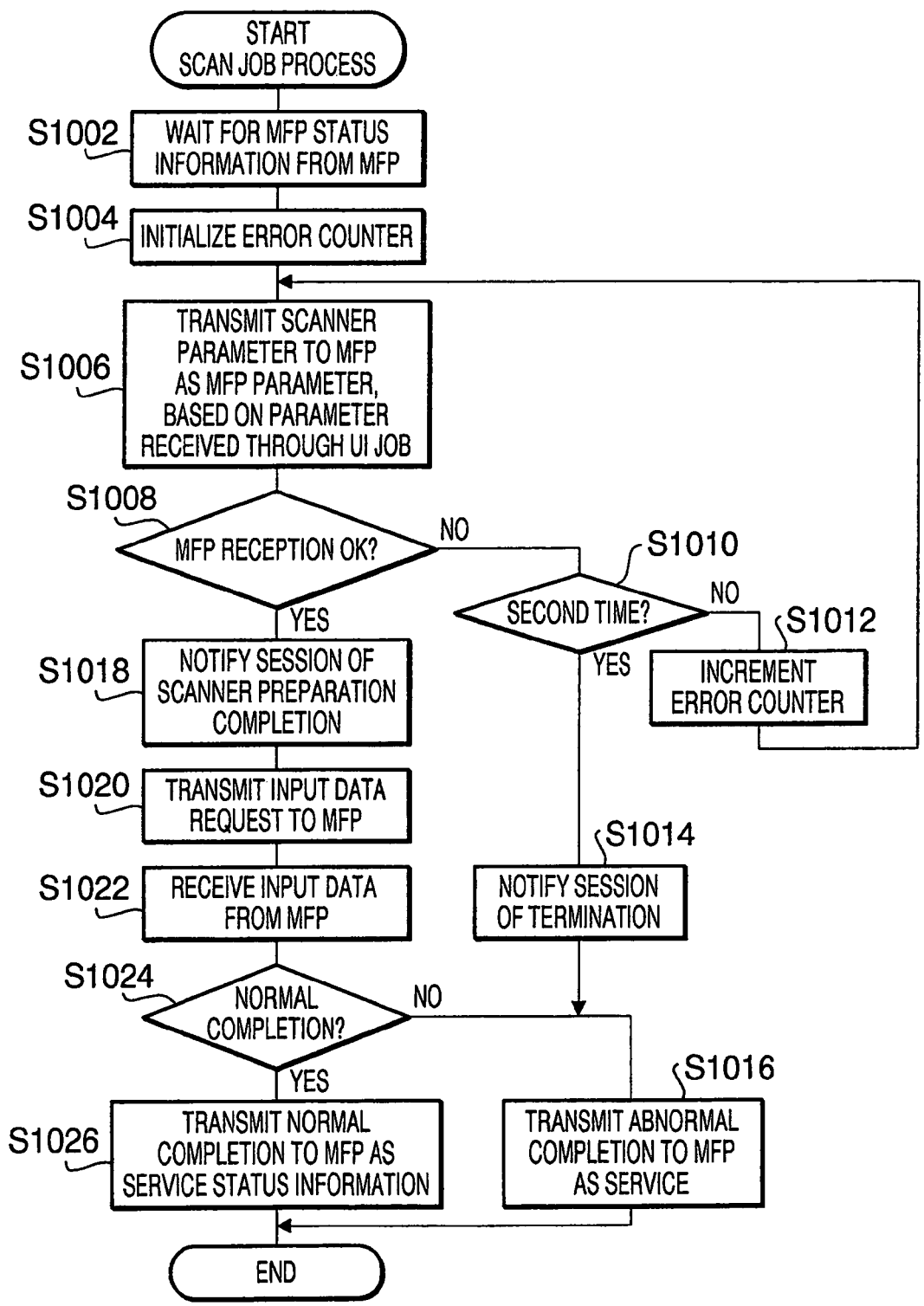
FIG. 24 shows a flowchart illustrating a scan job process executed by the function server according to aspects of the invention.

Since the MFP reception status indicating whether the MFP parameter was received successfully is transmitted from the MFP 10 which received the MFP parameter, the process judges whether the MFP parameter has been received successfully by the MFP 10 (S1108) in accordance with the MFP reception status, as in S1008 of FIG. 24.

If it is determined that the MFP parameter has not been received successfully by the MFP 10 (S1108: NO), the process judges whether such a situation has occurred consecutively by a predetermined number of times (twice in the illustrative embodiment) based on the value of the error counter (S1110). If such a situation is occurred consecutively by the predetermined number of times (S1110: NO), the process increments the error counter (S112) and returns to S1106.

If a state where the parameter cannot be received successfully occurs consecutively by the predetermined number of times (S1110: YES), termination (completion) of the print job is notified to the session process (S114), and then, a notification instruction indicating an abnormal completion is output as the service status information (S1116). This notification in S1114 is received by the session processing in S826 of FIG. 21. Further, in S1116, the notification instruction is stored in the storage area for storing the return information. Based on the stored information, the MFP control instruction is generated in S732 of FIG. 19, which is transmitted to the MFP 10 as the notification instruction in S734 of FIG. 20. This notification instruction is received by the MFP 10 in S510 of FIG. 18.

If it is determined that the MFP parameter has been received successfully by the MFP 10 (S1108: YES), the process determines that preparation for printing (by the recording unit 14) has been completed in the MFP 10 upon receipt of the MFP parameter, and completion of print preparation is notified to the session process (S1118). This notification is received by the session process in S824 of FIG. 21. In the session process, in response to receipt of this notification, steps S828 through S836 of FIG. 22 are performed and print data is transmitted.

Next, the process converts the print data generated in the session process (S832 of FIG. 22) into print data that can be processed by the MFP 10, and stores the converted to data in the storage area for storing the transmission information (S120). Based on the thus stored information, the MFP control instruction is created in S732 of FIG. 19, which is transmitted to the MFP 10 as the notification instruction in S734 of FIG. 20. The notification information is received by the MFP 10 in S520 of FIG. 18.

Figure 18:
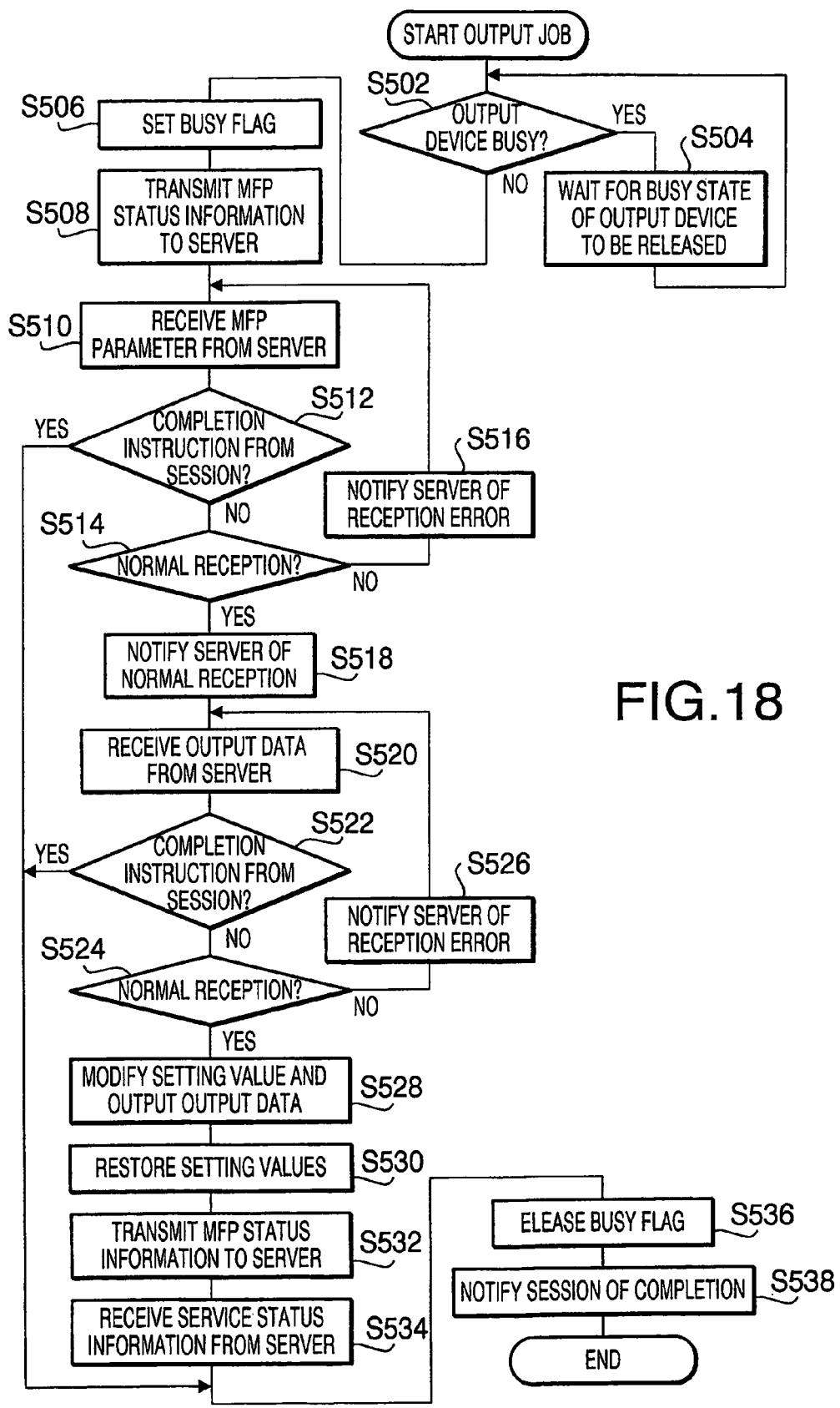
FIG. 18 is a flowchart illustrating an output job executed by the MFP according to aspects of the invention.

The MFP 10, which received the print data, transmits the MFP status information as the HTTP request (S532 of FIG. 18).

When the MFP status information is received from the MFP 10 that received the print data (S1122), if the MFP status information has been received successfully (S1124: YES), the process outputs the notification instruction indicating the normal completion as the service status information (S1126), and finishes the print job. In S1126, the notification information is stored in the storage area for storing the return information. Based on the stored information, the MFP control instruction is generated in S732 of FIG. 19, which is transmitted to the MFP 10 as the notification instruction (S734 of FIG. 20). The notification instruction is received by the MFP 10 in S534 of FIG. 18.

If the reception of MFP status information has not been completed successfully (S1124: NO), the process proceeds to S1116, where the process outputs the notification instruction indicating the abnormal completion as the service status information, and then completes the print job. This notification instruction is received by the MFP 10 in S534 of FIG. 18.

In the service providing system according to the illustrative embodiment configured as above, the MFP 10 realizes its function with receiving the service from the function server 30. Prior to receiving the function from the function server 30, a pre-processing necessary for receiving the service is executed in the MFP 10. During the pre-processing, the user can perform the user registration using the PC 60, which generally has a better user interface than the MFP 10, instead of performing the registration using the MFP 10 (S153 of FIG. 26). It should be noted that registration with the MFP 10 can be performed during the registration operation using the PC 10 (S155 of FIG. 26). Moreover, a registration completion page (e.g., in HTML format) may be returned from MFP 10 to PC 60 (S156 of FIG. 26) after registration of the service information with MFP 10. Therefore, according to the illustrative embodiment, registration errors or difficulty in registration operation can be reduced.

Further, when the service information is registered with the MFP 10, an HTML file (HTML2) including the service information as a hidden item of the <form> tag is transmitted from the function server 30 to the PC 60 (S154 of FIG. 26). Then, when the user depresses the submit button, the service information is transmitted from the PC 60 to the MFP 10 (S155 of FIG. 26). Therefore, it becomes unnecessary for the user to input the service information again and to transmit the same to the MFP 10, and the service information can be registered with the MFP 10 without requiring the user for a troublesome operation for registration.

The present invention need not be limited to the above-described illustrative embodiment, but various modifications can be made without departing from aspects of the invention.

For example, in the above-described illustrative embodiment, the MFP 10 is used as the terminal device of the network system. However, the terminal device may be any device if it can receive the service provided by the function server 30 and realize it. Examples of such a device may be a printer, a scanner and a facsimile device.

In the above-described illustrative embodiment, the PC 60 is used as the terminal device. It is noted that the invention need not be limited to such a configuration, and any device which have better user interface than the peripheral devices can be used as the terminal device in the service providing system. For example, a cell phone or PDA (Personal Digital Assistant) may be used as the terminal device.

In the service providing system according to the illustrative embodiment is described to include only one MFP 10, one directory server 20, one function server 30 and one PC 60. This configuration is for simplifying the description, and the service providing system according to the present invention may have various configurations including that of the above-described illustrative embodiment. For example, in the service providing system according to aspects of the present invention may include more than one MFP 10. That is, such a system may be configured such that each of the MFPs 10 may receive the service definition information 25 from a common directory server 20, and may request a common function server 30 for a service.

According to aspects of the invention, the directory server 20 (or part of the directory server 20) and/or the function server 30 (or a part of the function server 30) may be integrated as a single device.

Alternatively, according to aspects of the invention, the directory server 20 (or part of the directory server 20) and/or the function server 30 (or part of the function server 30) may be included in the MFP 10.

Figure 35:
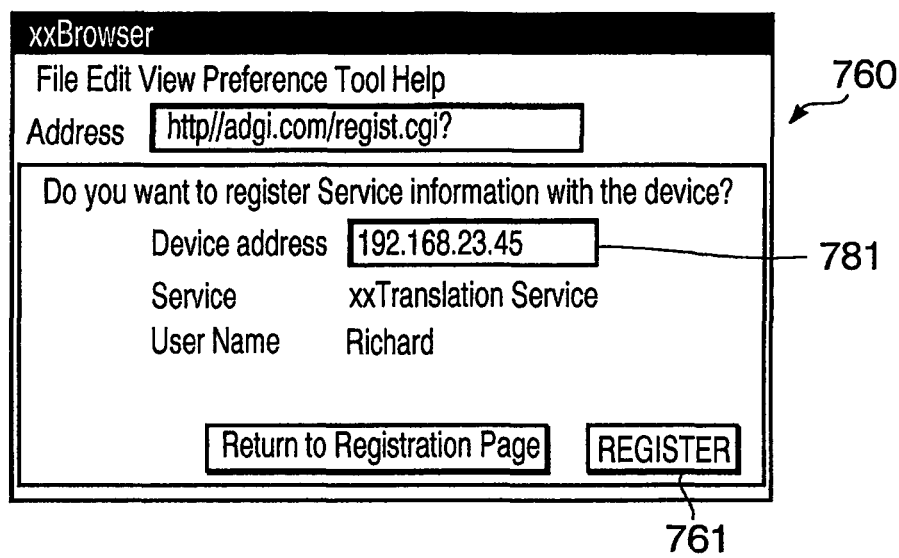

The service providing system according to the illustrative embodiment is configured such that the user inputs the address of the MFP 10 when the user registration is performed since the address is necessary to have the MFP 10 receive the service, and the input address is transmitted to the function server 30. However, if such an address is unnecessary for the function server 30, the system may be configured such that the address of the MFP 10 may be stored in the MFP 10, and need not be transmitted to the function server 30. In such a case, when the function server 30 transmits an HTML file to the MFP 10, a JAVA script or JAVA applet may be attached. Then, in the MFP 10, the HTML file may be modified by the JAVA script or JAVA applet and a file like an HTML2 (see FIG. 32) in which the address of the destination of the service definition information is set, may be automatically generated. Alternatively, the JAVA script may automatically input the address of the MFP 10 on the display (see the text box 781 of FIG. 35).

In the service providing system according to the illustrative embodiment, in the user registration operation required in the pre-processing for the MFP 10 to receive the service, the user needs to input the address of the device (MFP 10) manually. This may be modified such that the process automatically obtains the address of the MFP 10 on the network. In such a case, if there are candidates, they may be displayed as selective items.

What is claimed is:

1. A service registration system, comprising:
a server configured to provide a service through a network;
a peripheral device configured to communicate with the server and to use the service; and
a terminal device configured to communicate with the server and the peripheral device, the terminal device being physically different from the peripheral device and the server;
wherein the terminal device comprises:
a terminal device communication unit configured to communicate with the server and the peripheral device, wherein the terminal device is capable of communicating with the server independently of the peripheral device; and
an input device configured to receive, from a user, a registration request including registration requesting information for requesting the server to allow a registration, wherein registration enables the peripheral device to use the service provided by the server and wherein the registration requesting information includes a user ID,
wherein the terminal device communication unit is further configured to transmit the registration requesting information, including the user ID, to the server without use of the peripheral device,
wherein the server comprises:
a server communication unit enabling the server to communicate with the peripheral device and the terminal device, wherein the server communication unit is configured to:
receive the registration requesting information, including the user ID, from the terminal device without use of the peripheral device, and
transmit, to the terminal device without use of the peripheral device, service information required for the peripheral device to use the service in response to receiving the registration requesting information, including the user ID, from the terminal without use of the peripheral device, wherein the service is different from the registration, and wherein the service information includes the user ID, wherein the terminal device is further configured to:
receive a forward instruction from the user, and
forward the service information, including the user ID, to the peripheral device only upon the terminal device receiving the forward instruction from the user after receiving the service information, including the user ID, from the server without use of the peripheral device, and wherein the peripheral device comprises:
a peripheral device communicating unit enabling communication with the server and the terminal device; and
an information storage for storing the service information, when the peripheral device receives the service information, including the user ID, from the terminal device,
wherein the peripheral device is configured to operate in a mode where the service is usable by transmitting the user ID included in the service information to the server.

2. The service registration system according to claim 1, wherein the server is further configured to:
judge whether the registration request is appropriate when receiving the registration requesting information from the terminal device via the server communication unit,
transmit, through the service communication unit, the service information to the terminal device when the registration request is judged to be appropriate; and
wherein the peripheral device is further configured to communicate with the server via the peripheral device communication unit based on the service information stored in the information storage.

3. The service registration system according to claim 2, wherein the server is further configured to store image configuration information and to allow the image configuration information to be transmitted to the terminal device via the server communication unit, the image configuration information representing a configuration of an input image used when the terminal device receives the registration requesting information from the user,
wherein the terminal device further includes a displaying unit configured to display an image, the displaying unit displaying the input image, wherein the input image is configured in accordance with the image configuration information obtained from the server via the terminal device communication unit when the terminal device receives the registration requesting information from the user.

4. The service registration system according to claim 3, wherein the input image displayed by the displaying unit is provided with a portion in which peripheral device identifying information is to be input by the user,
wherein the terminal device communication unit is configured to transmit the peripheral device identifying information received by the terminal device to the server as one piece of the registration requesting information,
wherein the service communication unit of the server is configured to transmit the received peripheral device identifying information to the terminal device together with the service information,
wherein the terminal device communication unit identifies the peripheral device to which the service information is transmitted based on the peripheral device identifying information received from the server and transmits the service information to the identified peripheral device.

5. The service registration system according to claim 3, wherein the input image displayed by the displaying unit is provided with a portion allowing the user to input peripheral device identifying information,
wherein the terminal device is further provided with a storage device for storing the peripheral device identifying information,
wherein the terminal device stores the inputted peripheral device identifying information in the storage device when the registration request information is transmitted to the server, and
wherein the server is configured to identify the peripheral device to which the service information is transmitted based on the peripheral device identifying information stored in the storage device when the service information is received from the server, the server transmitting the service information to the identified peripheral device.

6. The service registration system according to claim 4, wherein the terminal device is further configured to search the peripheral device,
wherein the terminal device communication unit communicates with the peripheral device in accordance with a predetermined condition, and
wherein the displaying unit displays information regarding the searched peripheral device as part of the input image.

7. The service registration system according to claim 3, wherein the server configures a confirmation image allowing the user to confirm the service information and displays the confirmation image on the displaying unit when the service information is received from the server.

8. The service registration system according to claim 7, wherein the server stores the image configuration information of the confirmation image as an HTML file,
wherein the server communication unit transmits the image configuration information of the confirmation image together with the service information,
wherein the terminal device communication unit configures the confirmation image based on the image configuration information transmitted from the server, the terminal device communication unit transmitting the service information in accordance with a POST method in the HTML file.

9. The service registration system of claim 1, wherein the peripheral device cannot use the service until the peripheral device receives the service information corresponding to the service from the terminal device.

10. A terminal device configured to communicate with a server, the server providing a service through a network, and with a peripheral device physically different from the terminal device and the server, wherein the peripheral device is configured to communicate with the server to receive the service from the server, the terminal device comprising:
a terminal device communication unit configured to communicate with the server and the peripheral device;
a processor; and
memory operatively coupled to the processor and storing computer readable instructions, wherein the computer readable instructions, when executed, cause the terminal device to:
receive, from a user through an input interface of the terminal device, registration requesting information for requesting the server to allow a registration for the peripheral device to use the service provided by the server, wherein the service is different from the registration and wherein the registration requesting information includes a user ID;

transmit, without use of the peripheral device, the registration requesting information, including the user ID, received by the registration information receiving unit to the server via the terminal device communication unit;

receiving, without use of the peripheral device, service information required for use of the service by the peripheral device from the server, wherein the service information includes the user ID; and forward the received service information to the peripheral device only upon receiving a forward instruction from a user after receiving the service information from the server, wherein the service information, including the user ID, is received from the server in response to transmitting the registration requesting information to the server, wherein the service information enables the peripheral device to use the service by transmitting the user ID included in the service information to the server.

11. The terminal device of claim 10, wherein the peripheral device cannot use the service until the peripheral device receives the service information corresponding to the service from the terminal device.

12. A peripheral device configured to communicate with a server providing a service through a network and a terminal device to be used for service registration to use the service provided by the server, the peripheral device being further configured to use the service, wherein the peripheral device is physically different from the terminal device and the server, the peripheral device comprising:

a peripheral device communication unit enabling communication with the server and the terminal device; and an information storage unit for storing service information, including a user ID, when the peripheral device communication unit receives the service information, including the user ID, from the terminal device, wherein the information storage unit further stores computer readable instructions, wherein the computer readable instructions, when executed, cause the peripheral device to use the service by:

receiving, from the terminal device, service information required for the peripheral device to use the service, the service information including the user ID and being forwarded from the terminal device only when the terminal device receives a forward instruction from a user after receiving the service information from the server, wherein the service information is provided to the terminal device by the server without use of the peripheral device in response to registration requesting information sent from the terminal device to the server without use of the peripheral device, wherein the registration requesting information includes the user ID;

transmitting a confirmation of registration of the service information to the terminal device;

subsequent to transmitting the confirmation of registration, transmitting a request for the service to the server, the request including data to be processed according to the service and the user ID included in the service information, wherein the peripheral device communicates with the server based on the service information stored in the information storage unit;

in response to the request for the service, receiving, from the server, a modified version of the data and instructions for an action to be performed with the modified version of the data, the data having been transmitted to the server in the request for the service; and performing, by the peripheral device, the action using the modified version of the data.

13. The peripheral device of claim 12, wherein the peripheral device cannot use the service until the peripheral device receives the service information corresponding to the service from the terminal device.

14. One or more non-transitory computer readable media storing computer readable instructions, wherein the computer readable instructions, when executed, cause a computer to function as a terminal device, the terminal device being capable of communicating with a server, which provides a service through a network, and with a peripheral device, which communicates with the server to receive the service from the server, the instructions, when executed, further causing the computer to:

receive, from a user through an input device of the terminal device, registration requesting information for requesting the server to allow a registration of the peripheral device use the service provided by the server, the service being different from the registration and wherein the registration requesting information includes a user ID;

communicate with the server and the peripheral device, wherein the server, the peripheral device and the terminal device are physically different from one another;

transmit, without use of the peripheral device, the registration requesting information, including the user ID, received to the server;

receiving, without use of the peripheral device, service information required for use of the service from the server, the service information including the user ID; and forward the received service information to the peripheral device only upon receiving a forward instruction from a user after receiving the service information from the server, wherein the service information, including the user ID, is received by the terminal device from the server in response to the transmitting of the registration requesting information to the server, wherein the service information enables the peripheral device to use the service by transmitting the user ID included in the service information to the server.

15. The one or more non-transitory computer readable media of claim 14, wherein the peripheral device cannot use the service until the peripheral device receives the service information corresponding to the service from the terminal device.

16. One or more non-transitory computer readable media storing computer readable instructions, wherein the computer readable instructions, when executed, cause a computer to function as a peripheral device, the peripheral device being capable of communicating with a server configured to provide a service through a network and a terminal device to be used for a service registration to use the service provided by the server, the peripheral device being capable of using the service, the instructions, when executed, further causing the computer to:

receive, from the terminal device, service information required for the peripheral device to use the service, the service information including a user ID and being forwarded from the terminal device only when the terminal device receives a forward instruction from a user after receiving the service information from the server, wherein the service information, including the user ID, is provided to the terminal device by the server without use of the peripheral device in response to registration requesting information sent from the terminal device to the server without use of the peripheral device, wherein the registration requesting information includes the user ID;

transmit a confirmation of registration of the service information, including the user ID, to the terminal device;

subsequent to transmitting the confirmation of registration, transmit a request for the service to the server, the request including the user ID and data to be processed according to the service, wherein the peripheral device communicates with the server based on the service information stored in the information storage unit;

in response to the request for the service, receive, from the server, a modified version of the data and instructions for an action to be performed with the modified version of the data, the data having been transmitted to the server in the request for the service; and perform the action using the modified version of the data.

17. The one or more non-transitory computer readable media of claim 16, wherein the peripheral device cannot use the service until the peripheral device receives the service information corresponding to the service from the terminal device.

18. A service registration system, comprising:
a server configured to provide a service through a network, wherein the service is associated with at least one of scanned data and data to be printed;
a peripheral device configured to communicate with the server and to use the service, wherein the peripheral device comprises at least one of: a scanning device and a printing device; and
a terminal device configured to communicate with the server and the peripheral device, the terminal device being physically different from the peripheral device and the server;
wherein the terminal device comprises:
  a terminal device communication unit configured to communicate with the server and the peripheral device, wherein the terminal device is capable of communicating with the server independently of the peripheral device; and
  an input device configured to receive, from a user, a registration request including registration requesting information for requesting the server to allow a registration, wherein registration enables the peripheral device to use the service provided by the server, and wherein the registration requesting information includes a user ID,
  wherein the terminal device communication unit is further configured to transmit the registration requesting information, including the user ID, to the server without use of the peripheral device,
wherein the server comprises a server communication unit enabling the server to communicate with the peripheral device and the terminal device, and wherein the service communication unit is configured to:
  receive the registration requesting information, including the user ID, from the terminal device, and
  transmit, to the terminal device without use of the peripheral device, service information required for the peripheral device to use the service in response to receiving the registration requesting information, including the user ID, from the terminal without use of the peripheral device, wherein the service is different from the registration, and wherein the service information includes the user ID,
wherein the terminal device is further configured to forward the service information, including the user ID, to the peripheral device upon receiving the service information from the server, and
wherein the peripheral device comprises:
  a peripheral device communicating unit enabling communication with the server and the terminal device; and
  an information storage for storing the service information, when the peripheral device receives the service information, including the user ID, from the terminal device,
  wherein the peripheral device is configured to operate in a mode where the service is usable by transmitting the user ID included in the service information to the server.

19. The service registration system of claim 18, wherein the peripheral device cannot use the service until the peripheral device receives the service information corresponding to the service from the terminal device.

* * * * *